(12) United States Patent
Schleicher et al.

(10) Patent No.: US 11,877,528 B2
(45) Date of Patent: Jan. 23, 2024

(54) AGRICULTURAL MACHINE MAP-BASED CONTROL SYSTEM WITH POSITION ERROR RECTIFICATION

(71) Applicant: Deere & Company, Moline, IL (US)

(72) Inventors: Tyler D. Schleicher, Ankeny, IA (US); Curtis A. Maeder, Johnston, IA (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 172 days.

(21) Appl. No.: 17/461,373

(22) Filed: Aug. 30, 2021

(65) Prior Publication Data

US 2023/0060628 A1 Mar. 2, 2023

(51) Int. Cl.
*A01B 79/00* (2006.01)
*A01D 41/127* (2006.01)
*G05D 1/02* (2020.01)
*G05D 1/00* (2006.01)
*A01M 7/00* (2006.01)
*A01B 79/02* (2006.01)

(52) U.S. Cl.
CPC .......... *A01B 79/005* (2013.01); *A01D 41/127* (2013.01); *A01M 7/0089* (2013.01); *G05D 1/0094* (2013.01); *G05D 1/0212* (2013.01); *A01B 79/02* (2013.01)

(58) Field of Classification Search
CPC .. A01B 79/005; A01D 41/127; A01M 7/0089; G05D 1/0094; G05D 1/0212
USPC .......................................................... 701/50
See application file for complete search history.

(56) References Cited

U.S. PATENT DOCUMENTS

| | | | | |
|---|---|---|---|---|
| 9,488,736 | B2* | 11/2016 | Weisenburger | G06T 7/277 |
| 10,188,037 | B2* | 1/2019 | Bruns | A01D 41/1273 |
| 2016/0084813 | A1* | 3/2016 | Anderson | G01N 33/025 |
| | | | | 702/5 |
| 2016/0084987 | A1* | 3/2016 | Dybro | G01B 21/22 |
| | | | | 702/5 |
| 2017/0089742 | A1* | 3/2017 | Bruns | A01D 41/1273 |
| 2017/0336507 | A1* | 11/2017 | Chan | B64D 43/00 |
| 2018/0373259 | A1* | 12/2018 | Aberle | G05D 1/0278 |
| 2019/0223386 | A1* | 7/2019 | Limpert | F21V 33/0056 |
| 2022/0110258 | A1* | 4/2022 | Vandike | G05D 1/0278 |
| 2022/0167547 | A1* | 6/2022 | Vandike | G05B 13/048 |
| 2023/0060628 | A1* | 3/2023 | Schleicher | G05D 1/0094 |

FOREIGN PATENT DOCUMENTS

DE 10129135 A1 12/2002

OTHER PUBLICATIONS

German Search Report issued in application No. DE102022207537.4 dated May 5, 2023 (12 pages).

* cited by examiner

*Primary Examiner* — Yazan A Soofi
(74) *Attorney, Agent, or Firm* — Christopher J. Volkmann; Kelly, Holt & Christenson, PLLC

(57) ABSTRACT

A computer-implemented method of controlling a mobile agricultural machine includes obtaining prior field data representing a position of plants in a field, obtaining in situ plant detection data from operation of the mobile agricultural machine in the field, determining a position error in the prior field data based on the in situ plant detection data, and generating a control signal that controls the mobile agricultural machine based on the determined position error.

20 Claims, 18 Drawing Sheets

AGRICULTURAL MACHINE MAP-BASED CONTROL SYSTEM WITH POSITION ERROR RECTIFICATION

FIELD OF THE DESCRIPTION

The present description generally relates to agricultural machines that utilize field data, such as crop row maps. More specifically, but not by limitation, the present description relates to an agricultural machine control system that identifies and corrects position errors in prior field data based on in situ or field-truth data.

BACKGROUND

There are a wide variety of different types of agricultural machines. Such agricultural machines can include different types of seeders or planters, as well as tillers, sprayers, harvesters, and other equipment. Many agricultural operations are controlled using field maps or other field data obtained or formed prior to the agricultural operation. Position errors in the field data can result in sub-optimal performance. For instance, in the case of an agricultural sprayer, position errors in a crop map can result in spraying areas of the field that do not include the target plants (crop, weeds, etc.). In another example of a harvesting operation, position errors in a crop map can cause misalignment of the header with the crop rows.

The discussion above is merely provided for general background information and is not intended to be used as an aid in determining the scope of the claimed subject matter.

SUMMARY

A computer-implemented method of controlling a mobile agricultural machine includes obtaining prior field data representing a position of plants in a field, obtaining in situ plant detection data from operation of the mobile agricultural machine in the field, determining a position error in the prior field data based on the in situ plant detection data, and generating a control signal that controls the mobile agricultural machine based on the determined position error.

Example 1 is a computer-implemented method of controlling a mobile agricultural machine, the method comprising:
  obtaining prior field data representing a position of plants in a field;
  obtaining in situ plant detection data from operation of the mobile agricultural machine in the field;
  determining a position error in the prior field data based on the in situ plant detection data; and
  generating a control signal that controls the mobile agricultural machine based on the determined position error.

Example 2 is the computer-implemented method of any or all previous examples, wherein
  the prior field data comprises a first indication of a location of a crop row on the field;
  obtaining the in situ plant detection data comprises:
    receiving a plant detection signal from a plant detection sensor on the mobile agricultural machine; and
    receiving a location sensor signal that corresponds to the plant detection signal and is indicative of a sensed geographic location of the mobile agricultural machine on the field; and
  generating a second indication of the location of the crop row based on the plant detection signal and the sensed geographic location; and
  determining the position error comprises determining a distance between the first and second indications of the location of the crop row.

Example 3 is the computer-implemented method of any or all previous examples, wherein the plant detection sensor comprises a contact sensor configured to contact the plants in the field.

Example 4 is the computer-implemented method of any or all previous examples, wherein the prior field data comprises a georeferenced field map that identifies crop row locations in the field.

Example 5 is the computer-implemented method of any or all previous examples, wherein the mobile agricultural machine comprises a harvesting machine.

Example 6 is the computer-implemented method of any or all previous examples, wherein the mobile agricultural machine comprises an agricultural product application machine configured to apply an agricultural product to the field.

Example 7 is the computer-implemented method of any or all previous examples, wherein generating the control signal comprises controlling the mobile agricultural machine to generate modified field data by modifying the prior field data based on the determined position error.

Example 8 is the computer-implemented method of any or all previous examples, and further comprising:
  generating the modified field data based on determining that the position error meets a position error threshold.

Example 9 is the computer-implemented method of any or all previous examples, wherein the position error threshold is based on the location sensor signal.

Example 10 is the computer-implemented method of any or all previous examples, and further comprising determining a variance of the position error over a distance window; and generating the modified field data based on the variance.

Example 11 is the computer-implemented method of any or all previous examples, wherein generating the control signal comprises controlling the mobile agricultural machine based on the modified field data.

Example 12 is the computer-implemented method of any or all previous examples, wherein generating the control signal comprises controlling a user interface device of the mobile agricultural machine to render an indication of the position error.

Example 13 is a mobile agricultural machine comprising:
  a field operation subsystem configured to perform an agricultural operation on a field;
  a plant detection sensor configured to generate a plant detection signal indicative of plants detected on the field;
  a location sensor configured to generate a location signal indicative of a location of the mobile agricultural machine on the field; and
  a control system configured to:
    obtain prior field data representing a position of plants on the field;
    determine a position error in the prior field data based on the plant detection signal and the location signal; and
    generate a control signal that controls the mobile agricultural machine based on the determined position error.

Example 14 is the mobile agricultural machine of any or all previous examples, wherein
the prior field data comprises a first indication of a location of a crop row on the field; and
the control system is configured to:
generate a second indication of the location of the crop row based on the plant detection signal and the sensed geographic location; and
determine the position error based on a distance between the first and second indications of the location of the crop row.

Example 15 is the mobile agricultural machine of any or all previous examples, wherein
the plant detection sensor comprises a contact sensor configured to contact the plants in the field, and
the prior field data comprises a georeferenced field map that identifies crop row locations in the field.

Example 16 is the mobile agricultural machine of any or all previous examples, wherein the mobile agricultural machine comprises one of:
a harvesting machine, or
an agricultural product application machine configured to apply an agricultural product to the field.

Example 17 is the mobile agricultural machine of any or all previous examples, wherein the control system is configured to:
generate modified field data based on a determination that the position error meets a position error threshold.

Example 18 is the mobile agricultural machine of any or all previous examples, wherein the control system is configured to:
determine a variance of the position error over a distance window;
generate the modified field data based on the variance; and
control the mobile agricultural machine based on the modified field data.

Example 19 is a control system for a mobile agricultural machine, the control system comprising:
at least one processor; and
memory storing instructions executable by the at least one processor, wherein the instructions, when executed, cause the control system to:
obtain prior field data representing a position of plants in a field;
obtain in situ plant detection data from operation of the mobile agricultural machine in the field;
determine a position error in the prior field data based on the in situ plant detection data; and
generate a control signal that controls the mobile agricultural machine based on the determined position error.

Example 20 is the control system of any or all previous examples, wherein
the prior field data comprises a first indication of a location of a crop row on the field;
obtaining the in situ plant detection data comprises:
receiving a plant detection signal from a plant detection sensor on the mobile agricultural machine; and
receiving a location sensor signal that corresponds to the plant detection signal and is indicative of a sensed geographic location of the mobile agricultural machine on the field; and
generating a second indication of the location of the crop row based on the plant detection signal and the sensed geographic location; and
determining the position error comprises determining a distance between the first and second indications of the location of the crop row.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 9-1 and 9-2 (collectively referred to as FIG. 9) is a flow diagram illustrating one example of field data error identification and correction.
FIG. 10-1 illustrates one example of prior field data.
FIG. 10-2 illustrates in situ plant location data in the context of the prior field data of FIG. 10-1.
FIG. 10-3 illustrates an example of corrected field data.

DETAILED DESCRIPTION

As noted above, many agricultural operations utilize field data, such as previously generated field maps. This field data can be acquired in any of a number of ways, some of which are discussed in further detail below. Briefly, however, aerial imagery can be captured with a drone or unmanned aerial vehicle (UAV), satellite images can be obtained from a satellite system, seed placement locations can be mapped during planting, etc. Further, this prior field data can be used during subsequent operations, such as during spraying, harvesting, cultivating, to name a few. One such technique is referred to as precision farming. Precision farming, or precision agriculture, is also referred to as site-specific crop management. The technique uses observation and measurement of variations of different criteria at specific sites. The system's ability to locate precise position in the field allows for the creation and use of maps on many variables.

A map-based system can acquire images or other plant-location data, and geo-reference the data to create a geo-referenced field map. For instance, to locate the image for use on the ground, location data (e.g., Global Navigation Satellite System (GNSS) data) can be captured and utilized for positional rectification align the image with features on the ground or in the field itself. When the data is subsequently utilized by an agricultural machine, position sensors (e.g., GNSS receivers) track the location of the machine as the machine passes along the field on a particular path. Thus, the path of the machine can be determined based on the positional data, and the locations of the actuators, tools, etc. of the machine can be determined based on dimensions of the machine (e.g., a location of a spray nozzle relative to the GNSS receiver). Position errors can accumulate as a result of system and/or operator errors, both when the field data is obtained as well as when the data is utilized by the agricultural machine during the subsequent operation.

The present disclosure provides a system for an agricultural environment that identifies and corrects position errors in field data, such as a georeferenced crop map. The field data can include data that is remotely sensed (e.g., aerial imagery, etc.) and/or other prior data that is obtained during previous operation in the field. The position errors in the field data are identified and corrected based on in situ or field-truth data obtained from sensors on or otherwise associated with the agricultural machine. In examples discussed in further detail below, tactile or contact sensors are utilized, such as a crop stock detector that mechanically engages and detects the location of crop stocks to identify an actual location of the crop rows in the field. Of course, in other examples, non-contact sensors can be utilized to acquire in situ or field-truth data to perform field data identification and correction.

Figure 1:
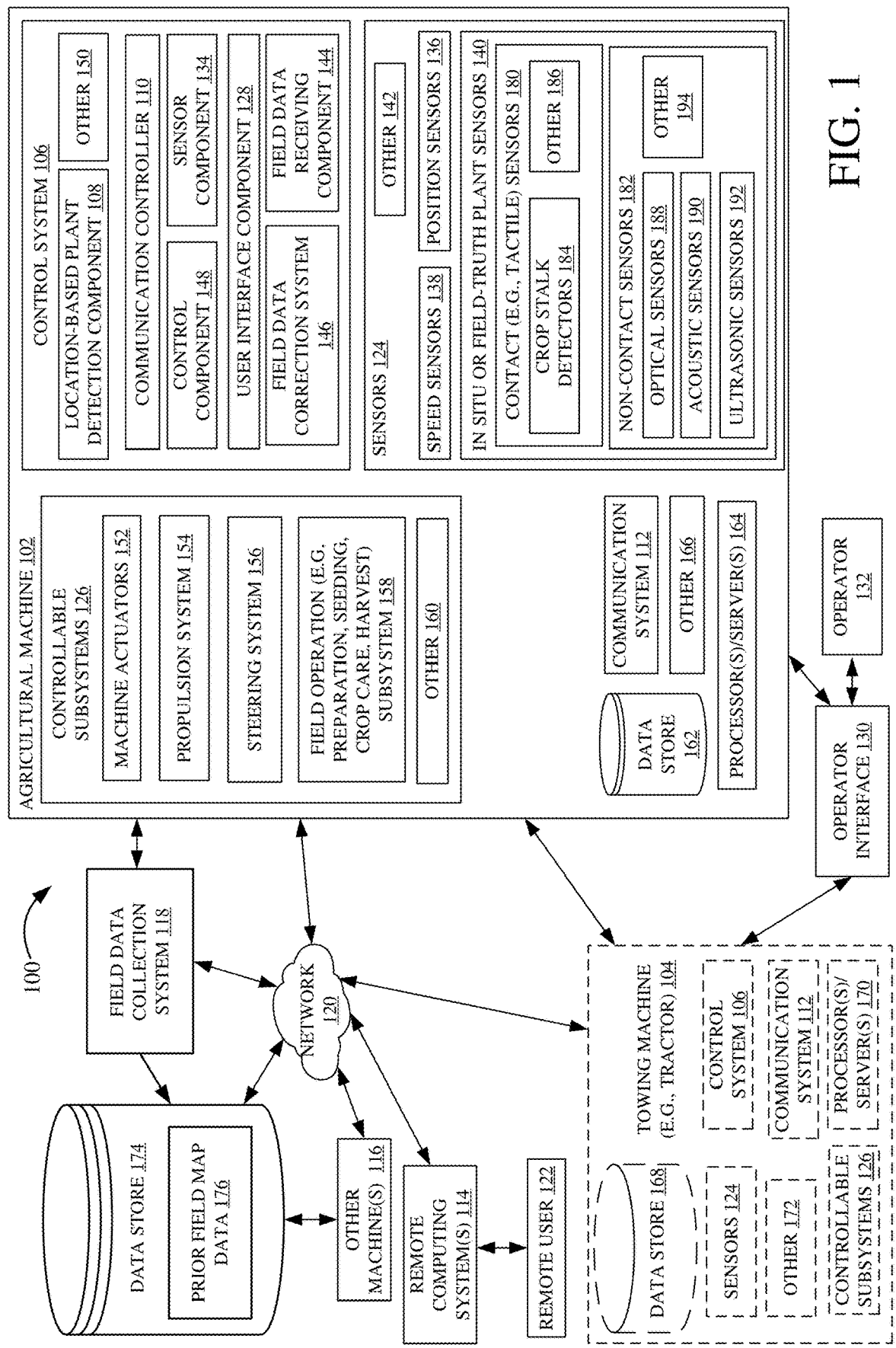
FIG. 1 illustrates one example of an agricultural architecture for position error correction of field data.

FIG. 1 illustrates one example of an agricultural architecture 100 that includes an agricultural machine 102. It is noted that machine 102 can be any of a wide variety of different types of agricultural machines. Examples include, but are not limited to, a tilling machine, a planting machine, a product application (e.g., spraying) machine, a harvesting machine (also referred to as a "harvester" or "combine"), to name a few. Also, while machine 102 is illustrated with a single box in FIG. 1, machine 102 can include multiple machines (e.g., a towed implement towed by a towing machine 104). In this example, the elements of machine 102 illustrated in FIG. can be distributed across a number of different machines (represented by the dashed blocks in FIG. 1).

Machine 102 includes a control system 106 configured to control other components and systems of architecture 100. For instance, control system 106 includes a location-based plant detection component 108 and a communication controller 110 configured to control a communication system 112 to communicate between components of machine 102 and/or with other machines or systems in architecture 100, such as machine 104, remote computing system 114, machine(s) 116, and/or a field data collection system 118, either directly or over a network 120.

Machines 116 can include similar types of machines as machine 102, and/or machines 116 can include different types of machines as well. Further, machines 116 can include a machine simultaneously operating in a field (e.g., machines 102 and 116 are in a fleet of machines performing the same or different operations) and/or a machine that operates at a different time (before or after machine 102). For sake of illustration, in an example in which machine 102 is a spraying machine that sprays fertilizer, herbicide, or other agricultural product, machine 116 can be a planting machine that planted the field being sprayed by machine 102, another spraying machine working in conjunction with machine 102, and/or a harvesting machine that will subsequently harvest the field.

Network 120 can be any of a wide variety of different types of networks including, but not limited to, a wide area network, such as the Internet, a cellular communication network, a local area network, a near field communication network, or any of a wide variety of other networks or combinations of networks or communication systems.

A remote user 122 is illustrated interacting with remote computing system 114. Remote computing system 114 can be a wide variety of different types of systems. For example, remote system 114 can be a remote server environment, remote computing system that is used by remote user 122. Further, remote system 114 can include a mobile device, remote network, or a wide variety of other remote systems. Remote system 114 can include one or more processors or servers and a data store, and can include other items as well.

Communication system 112 can include wired and/or wireless communication components, which can be substantially any communication system that can be used by the systems and components of machine 102 to communicate information to other items, such as between control system 106, sensors 124, and controllable subsystems 126. In one example, communication system 112 communicates over a controller area network (CAN) bus (or another network, such as an Ethernet network, etc.) to communicate information between those items. This information can include the various sensor signals and output signals generated by the sensor variables and/or sensed variables.

Control system 106 also includes a user interface component 128 configured to control interfaces, such as an operator interface 130 that include input mechanisms configured to receive input from an operator 132 and output mechanisms that render outputs to operator 132. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Control system 106 also includes a sensor component 134 configured to interact with and control sensors 124, which can include any of a wide variety of different types of sensors. In the illustrated example, sensors 124 include position sensors 136, speed sensors 138, and in situ or field-truth plant sensors 140, and can include other types of sensors 142 as well. Position sensors 136 are configured to determine a geographic position of machine 102 on the field, and can include, but are not limited to, a Global Navigation Satellite System (GNSS) receiver that receives signals from a GNSS satellite transmitter. Position sensors 136 can also include a Real-Time Kinematic (RTK) component that is configured to enhance the precision of position data derived from the GNSS signal. Speed sensors 138 are configured to determine a speed at which machine 102 is traveling the field during the spraying operation. This can include sensors that sense the movement of ground-engaging elements (e.g., wheels or tracks) and/or can utilize signals received from other sources, such as position sensors 136.

Control system 106 includes a field data receiving component 144 configured to receive field data, such as prior crop/weed maps, and a field data correction system 146 configured to identify and correct position errors in the field data. This is discussed in further detail below. Briefly, however, field data correction system 146 generates in situ or field-truth plant location data based on plant detection signals received from sensors 140 and position data received from position sensors 136. Based on the in situ plant location data, system 146 identifies and corrects errors in the field data.

Control system 106 includes a control component 148 and can include other items 150. Control component 148 is configured to generate control signals to control sensors 124, controllable subsystems 126, communication system 112, or any other items in architecture 100. Controllable subsystems 126 include machine actuators 152, a propulsion subsystem 154, a steering subsystem 156, and a field operation subsystem 158, and can include other items 160 as well.

In one example, control of the traversal of machine 102 over the field can be automated or semi-automated, for example using an automated guidance system. An example guidance system is configured to guide machine 102 along a path across the field using the geographic position sensed by sensors 136.

Subsystem 158 is configured to perform field operations (e.g., field preparation, crop care, harvesting, etc.) while machine 102 traverses the field or other worksite. A field operation refers to any operation performed on a worksite or field. Examples include, but are not limited to, field preparation (e.g., tilling), crop seed placement (e.g., planting), crop care (e.g., fertilizer spraying), harvesting, etc.

For instance, in the case of a planting machine, subsystem 158 includes seed metering and distributions components, such as row units on a row unit planter. In the case of a spraying machine, subsystem 158 includes pumps, valves, lines, spray nozzles, etc. In the case of a harvesting machine, subsystem 158 includes front-end equipment (e.g., a header), thresher, spreader, etc.

Machine 102 includes a data store 162 configured to store data for use by machine 102, such as field data. Examples of data stored in data store 162 include, but are not limited to, field location data that identifies a location of the field to be operated upon by a machine 102, field shape and topography data that defines a shape and topography of the field, crop location data that is indicative of a location of crops in the field (e.g., the location of crop rows), or any other data. Machine 102 is also illustrated as including one or more processors or servers 164, and machine can include other items 166 as well. Further, where machine 102 is towed by a towing machine 104, machine 104 can include a data store 168 and one or more processors or servers 170, and can include other items 172.

Field data collection system 118 illustratively collects field data, such as prior data corresponding to a target field to be operated upon by machine 102. The field data is corrected by field data correction system 146 and can be used by control system 106 to control subsystems 126 while machine 102 operates on the target field. This is discussed in further detail below. Briefly, by prior, it is meant that the data is formed or obtained beforehand, prior to the operation by machine 102. The data generated by system 118 can be sent to machine 102 directly and/or can be stored in a data store 174 as prior field map data 176. Control system 106 can use this data to control operation of one or more subsystems 126.

For instance, control system 106 can be configured to generate control signals for subsystems 126 to implement section control, so that machine 102 operates on the desired areas of the field. For example, in the case of an agricultural spraying machine, control system is configured to control steering subsystem 156 and/or independently control sections of spray nozzles to selectively spray areas of the field, such as turning selected spray nozzles on/off. In one example of an agricultural harvesting machine, the machine can be positioned to align the header with the crop rows and/or control the header to selectively harvest only a portion of the width of the machine. These, of course, are for sake of example only.

Plant sensors 140 are configured to detect plants (e.g., crop rows, weeds, etc.) as agricultural machine 102 traverses the field. Sensors 140 include on-board sensors mounted on machine 102 or otherwise associated with machine 102. Sensors 140 can thus include row distance or row location sensors configured to sense a distance between a portion of machine 102 (such as wheels or tracks) and one or more adjacent crop rows. Some specific examples of sensors 140 are described below.

Plant sensors 140 can detect the crop rows by directly and/or indirectly sensing the plants in the field. For instance, sensors 140 can detect individual plants on the field. In another example, sensors 140 can detect soil berms or ridges that indicate the edge of a crop row. As shown in FIG. 1, plant sensors 140 can include contact sensors 180 and non-contact sensors 182. Contact sensors 180 include tactile sensors and are configured to physically contact the plants on the field. Sensors 180 can take a wide variety of different forms. For instance, contact sensors 180 can include crop stock detectors 184 having, for example, deflectable finger sensors that contact the row crops and deflect in response to that contact. The amount of deflection is representative of the distance to the row. When the deflectable fingers are closer to the row crop, the fingers deflect at a greater angle than when the fingers are further away from the row crop. The output signal (such as a voltage) from the sensor increases or decreases based on the amount of deflection. In one example, a sensor (such as a Hall Effect sensor or other sensors) can be used to generate a signal that is proportional or representative of the amount of deflection of the deflectable fingers. Of course, contact sensors 180 can include other sensors 186 as well.

Examples of non-contact sensors 182 include optical sensors 188, such as camera-based sensors. Optical sensors 188 can be used to capture optical data indicative of the location of the rows relative to machine 102. In other examples, the sensors can be laser-based sensors that sense the distance of the crop row relative to a portion of machine 102, such as the wheels. Sensors can also include acoustic sensors 190, ultrasonic sensors 192, or other types of sensors 194. In one example, inputs from contact and non-contact sensors can be combined to detect rows within a canopy image. The sensor signals from sensors 140 can be conditioned, if desired, and provided to a distance measuring component which generates distance values from the sensed variables.

Figure 2:
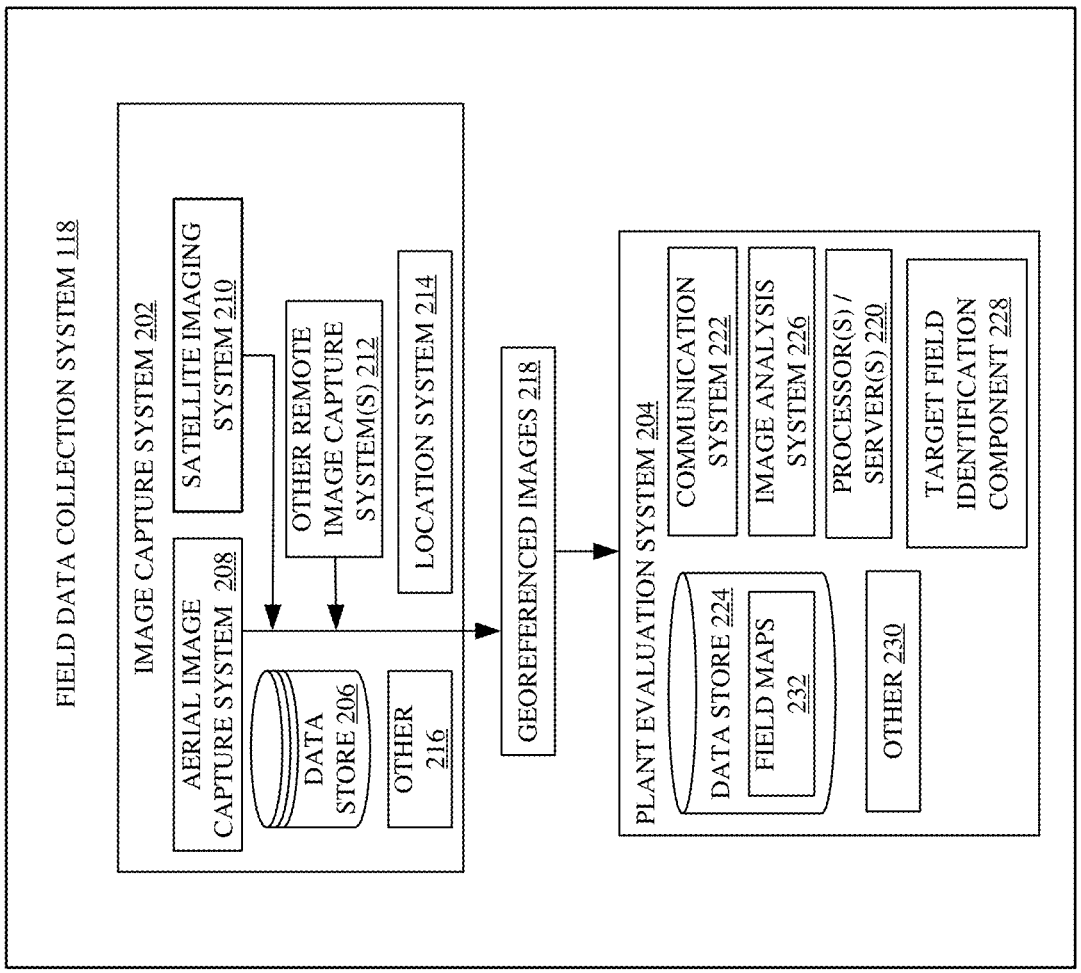
FIG. 2 illustrates one example of a field data collection system.

FIG. 2 illustrates one example of field data collection system 118. As illustrated, system 118 includes an image capture system 202 that includes image capture components configured to capture images of the area under consideration (i.e., portions of the field to be operated upon by machine 102) and image processing components configured to process those images. The captured images represent a spectral response captured by image capture system 202 that can be provided to a plant evaluation system 204 and/or stored in a data store 206.

Image capture system 202 can include one or more of an aerial image capture system 208, a satellite imaging system 210, and/or other image capture systems 212. An example of aerial image capture system 208 includes a camera or other imaging component carried on an unmanned aerial vehicle (UAV) or drone.

System 202 includes a location system 214, and can include other items 216 as well. Location system 214 is configured to generate a signal indicative of a geographic location associated with the capture image. For instance, location system 214 can output GNSS coordinates that are associated with the captured image to obtain geo-referenced images 218. Images 218, in one example, can be provided to plant evaluation system 204, which includes one or processors or servers 220, a communication system 222, a data store 224, an image analysis system 226, and a target field identification component 228. System 204 can include other items 230 as well.

Target field identification component 228 is configured to identify a target or subject field for which geo-referenced field map data is being generated. Based on analysis of the images by system 226, field maps 232 are generated and represent the locations of crops and/or weeds in the target field under analysis.

A field map generated based on images 218 can include position error. An example of position error is an offset between the plant location indicated on the field map and the actual planting location on the field. For instance, in the case of images acquired from a UAV, even slight changes in the angle of the orientation (relative to a horizontal plane) of the UAV can result in the field of view for the captured image being offset by several meters, and can be especially pronounced in situations in which the UAV is flown at high altitudes or in severe weather conditions, such as high wind gusts. Also, the position error can result from optical errors in the image capture components, such as errors caused by a camera lens. In another example, when the prior field map is generated based on multiple images, position error can result from stitching errors (e.g., when there is misalignment between two adjacent images).

In addition to being generated based on remotely obtained images such as a UAV or satellite system, field maps 232 can be generated based on prior operation of other agricultural machines in the field. For instance, during planting, sensors on a planting machine can detect the location of the row units and generate a geo-referenced field crop map, using the detected position of the planting machine and the relative positions of the row unit across the planting machine. Similar to the remote imaging scenarios discussed above, position errors can exist in the field map. For instance, assume that, in one example, some or all of the row units on the planter place the seeds a distance (e.g., several inches or more) from where the seed placement is intended. Thus, while the planting operation generates a field map that identifies locations of the crop rows on the field, the actual crop locations are offset, resulting in position error. Of course, position errors can be caused by any of a number of factors, such as inaccuracy in the GNSS or other location detection system.

Before describing the system and operation in more detail, a number of different examples of agricultural machines will be described.

Figure 3:
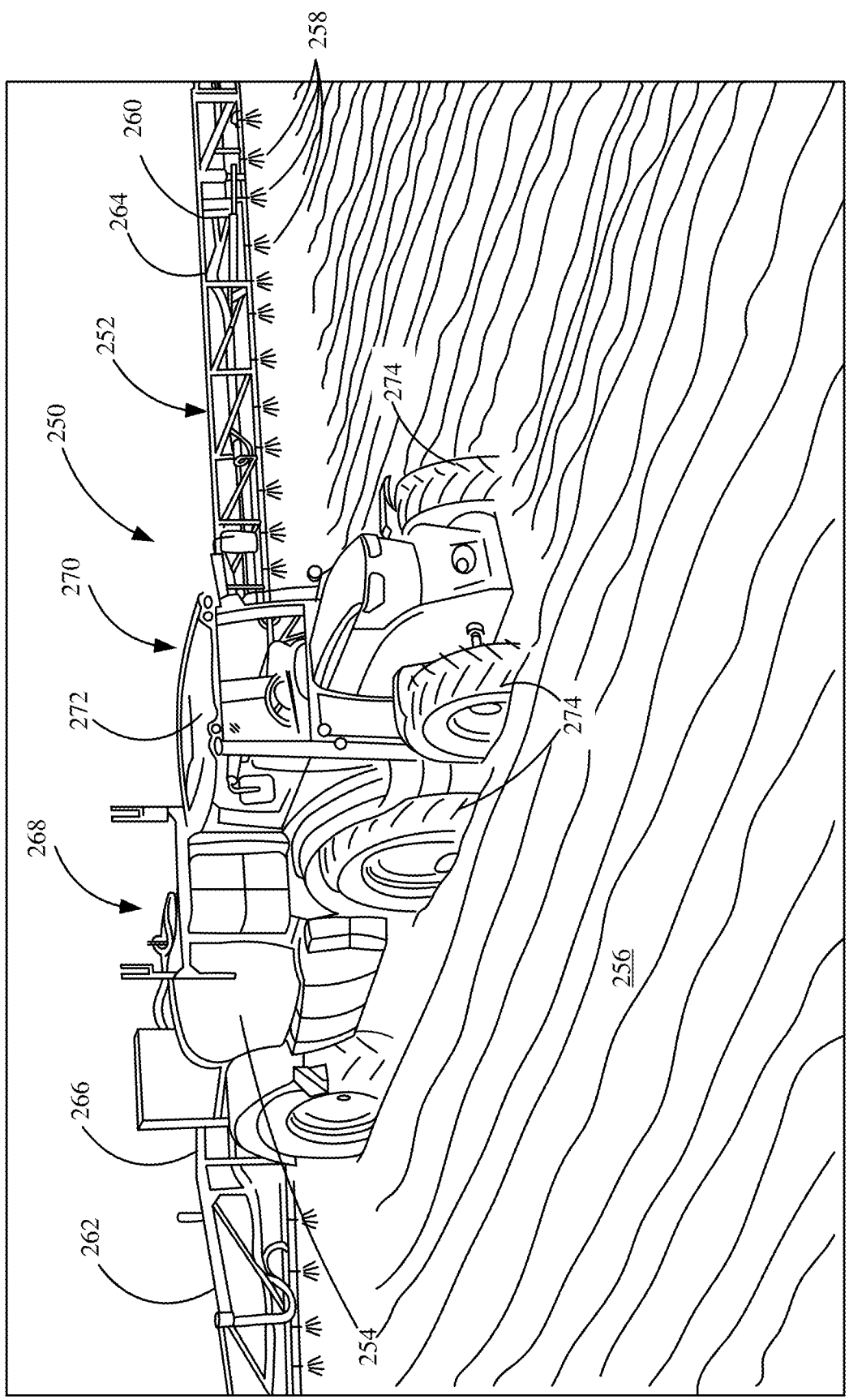
FIG. 3 illustrates one example of an agricultural machine.

FIG. 3 illustrates one example of an agricultural machine 250, in the form of a sprayer or spraying machine. Machine 250 includes a spraying system 252 having a tank 254 containing a liquid that is to be applied to field 256. Tank 254 is fluidically coupled to spray nozzles 258 by a delivery system comprising a set of conduits. A fluid pump is configured to pump the liquid from tank 254 through the conduits and nozzles 258. Nozzles 258 are coupled to, and spaced apart along, boom 260. Boom 260 includes arms 262 and 264 which can articulate or pivot relative to a center frame 266. Thus, arms 262 and 264 are movable between a storage or transport position and an extended or deployed position (shown in FIG. 3).

In the example illustrated in FIG. 3, machine 250 includes a towed implement 268 that carries the spraying system, and is towed by a towing or support machine 270 (e.g., machine 104) having an operator compartment or cab 272. Machine 270 includes a set of traction elements, such as wheels 274. The traction elements can also be tracks, or other traction elements as well. It is noted that in other examples, machine 250 is self-propelled. That is, rather than being towed by a towing machine, the machine that carries the spraying system also includes propulsion and steering systems.

Figure 4:
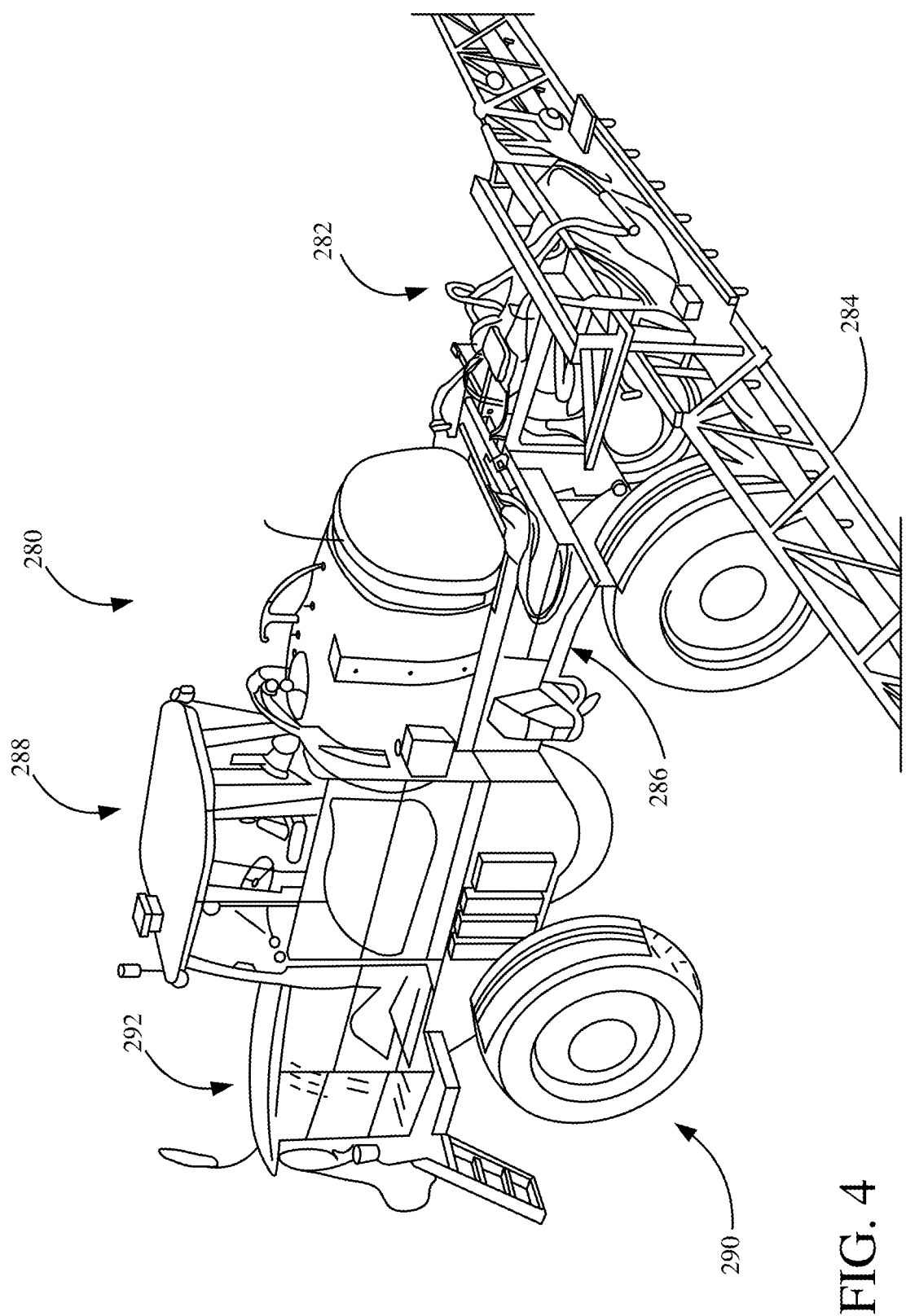
FIG. 4 illustrates one example of an agricultural machine.

FIG. 4 illustrates one example of an agricultural spraying machine 280 that is self-propelled. That is, spraying machine 280 has an on-board spraying system 282, that is carried on a machine frame 286 having an operator compartment 288, a steering system 290 (e.g., wheels or other traction elements), and a propulsion system 292 (e.g., internal combustion engine).

Figure 5:
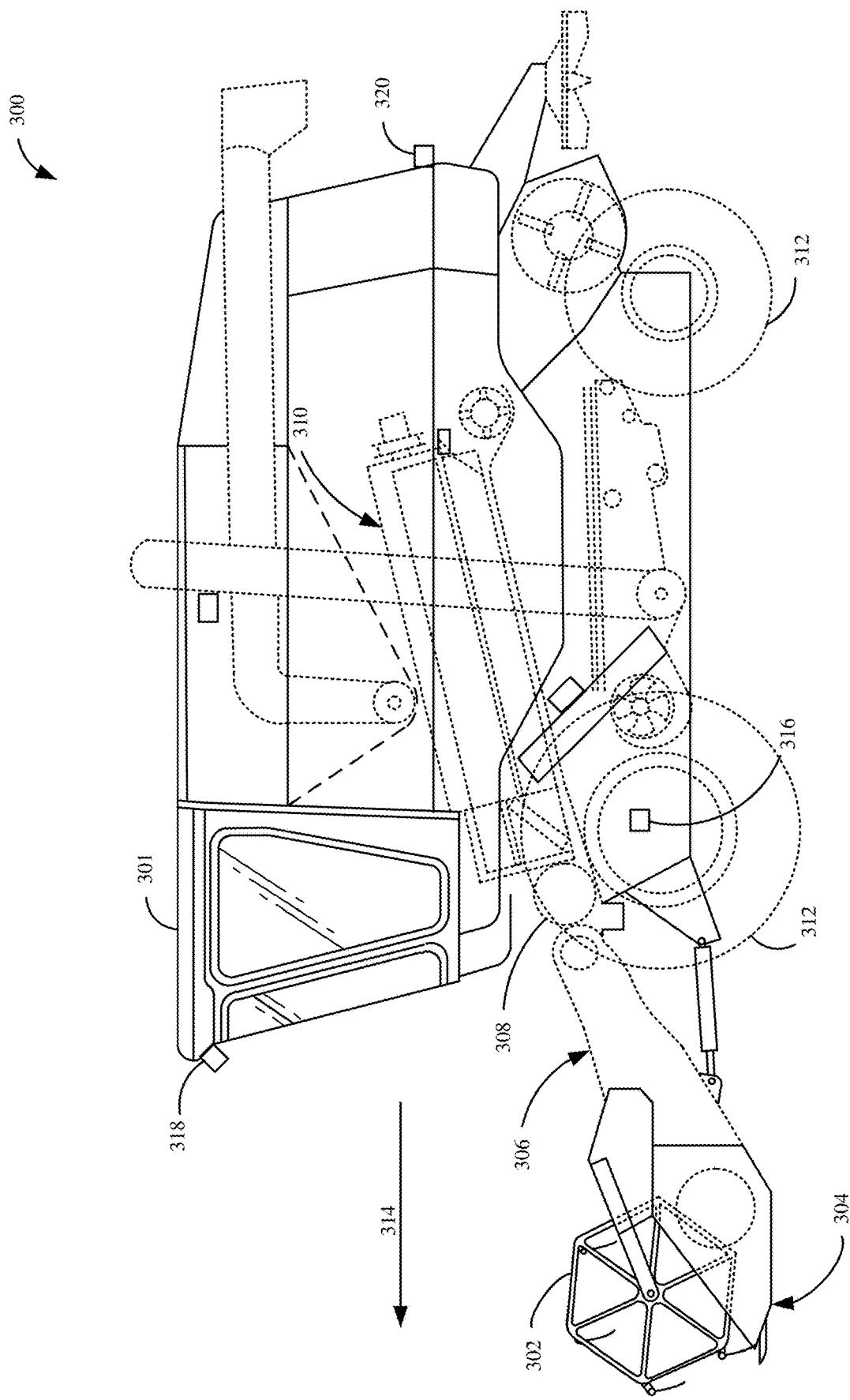
FIG. 5 illustrates one example of an agricultural machine.

Another example agricultural machine is shown in FIG. 5, which is an illustration of an agricultural harvesting machine 300 (or combine). Combine 300 illustratively includes an operator compartment 301, which can have a variety of different operator interface mechanisms, for controlling combine 300, as will be discussed in more detail below. Combine 300 can include a set of front-end equipment that can include header 302, and a cutter generally indicated at 304. Combine 300 can also include a feeder house 306, a feed accelerator 308, and a thresher generally indicated at 310. Combine 300 can include a cleaning subsystem, and the material handling subsystem can include (in addition to a feeder house 306 and feed accelerator 308) a discharge beater, tailings elevator, clean grain elevator (that moves clean grain into clean grain tank) as well as unloading auger and spout. Combine 300 can further include a residue subsystem that can include a chopper and a spreader. Combine 300 can also have a propulsion subsystem that includes an engine that drives ground engaging wheels 312 or tracks, etc.

In operation, and by way of overview, combine 300 illustratively moves through a field in the direction indicated by arrow 314. As combine 300 moves, header 302 engages the crop to be harvested, and gathers the crop toward cutter 304. After the crop is cut, the crop is moved through a conveyor in feeder house 306 toward feed accelerator 308, which accelerates the crop into thresher 310.

FIG. 5 also shows that, in one example, combine 300 can include ground speed sensor 316, forward looking camera 318, rearward looking camera 320, and a wide variety of other cameras or image/video capture devices. Ground speed sensor 316 illustratively senses the travel speed of combine 300 over the ground. Ground speed sensing can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Figure 6:
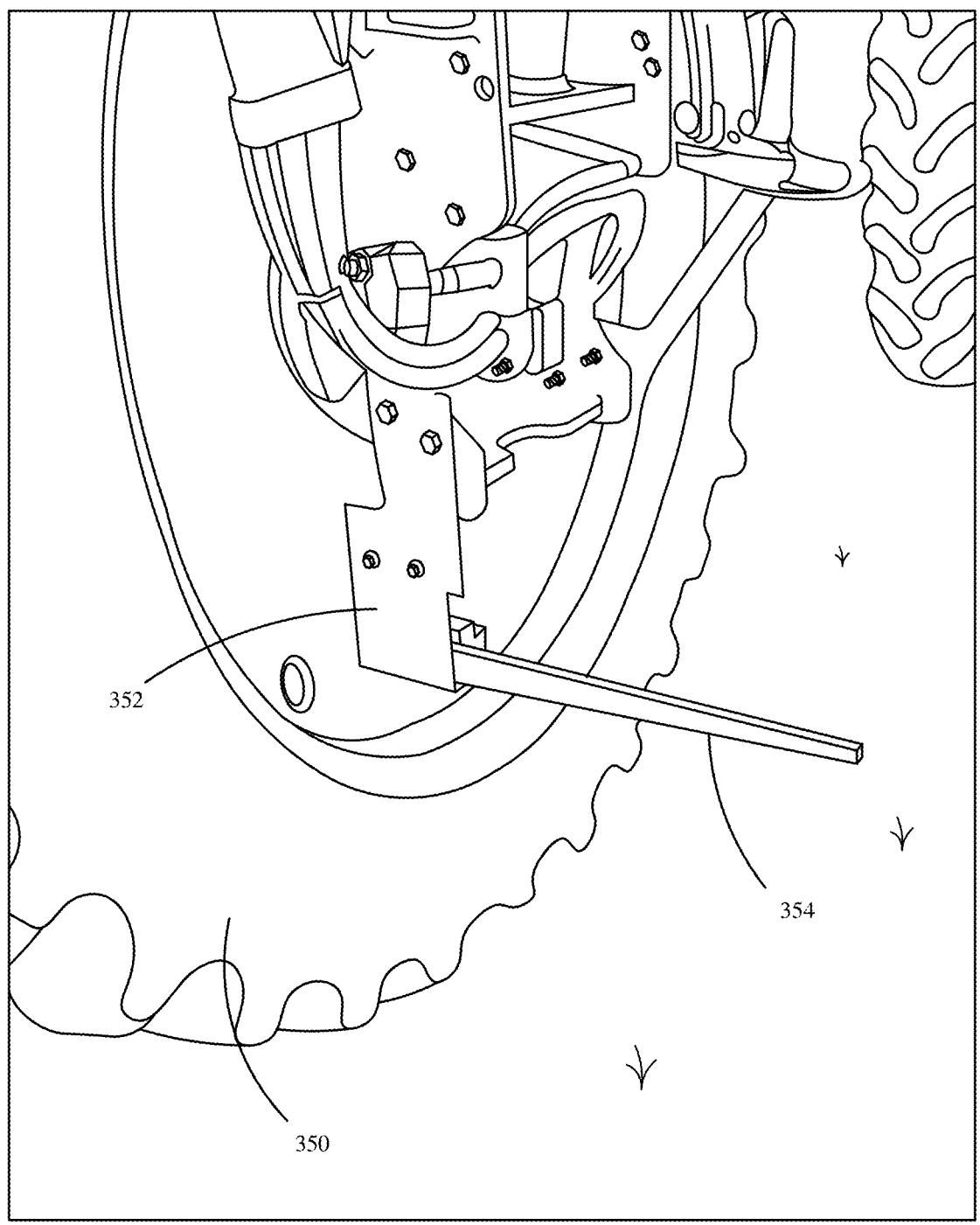
FIG. 6 illustrates one example of a tactile sensor on an agricultural machine.
Figure 7:
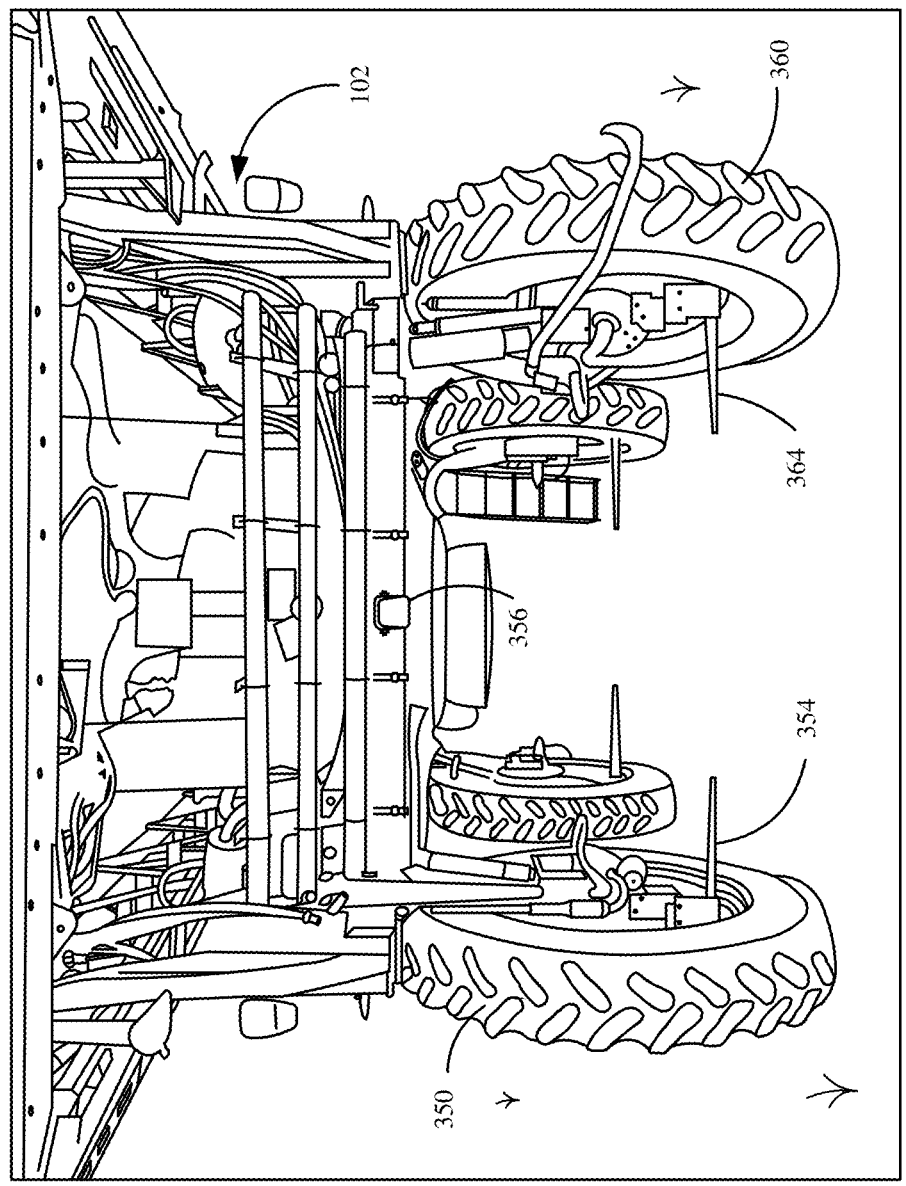
FIG. 7 illustrates one example of a tactile sensor on an agricultural machine.

FIGS. 6 and 7 illustrates an example of a contact sensor 180. FIG. 6 shows that a wheel 350 is illustratively supported by an axle. A support mechanism 352 supports a deflectable finger 354 closely proximate to wheel 350. Deflectable finger 354 contacts the crop in a crop row as machine 102 moves in a forward direction. The degree (or amount) of deflection is representative of a distance of the inside of wheel 350 from the row crop being contacted. FIG. 7 shows that an optical sensor (such as a camera) 356 can be mounted to the front of machine 102 (and another can be mounted to rear). With a wide enough field of view, the camera can capture an image that shows both front wheels (and the other camera can capture an image that shows both rear wheels).

Wheels 350 and 360 have deflectable fingers 354 and 364 disposed proximate their inner surfaces. Thus, as wheels 350 and 360 move closer to or further from the respective crop rows, deflectable fingers 354 and 364 will deflect by an amount that is representative of the distance between the corresponding wheels and the adjacent rows. As wheels 350 and 360 move along the field, deflectable fingers 354 and 364 illustratively deflect to an extent that is indicative of the distance of those wheels to the adjacent rows.

Figure 8:
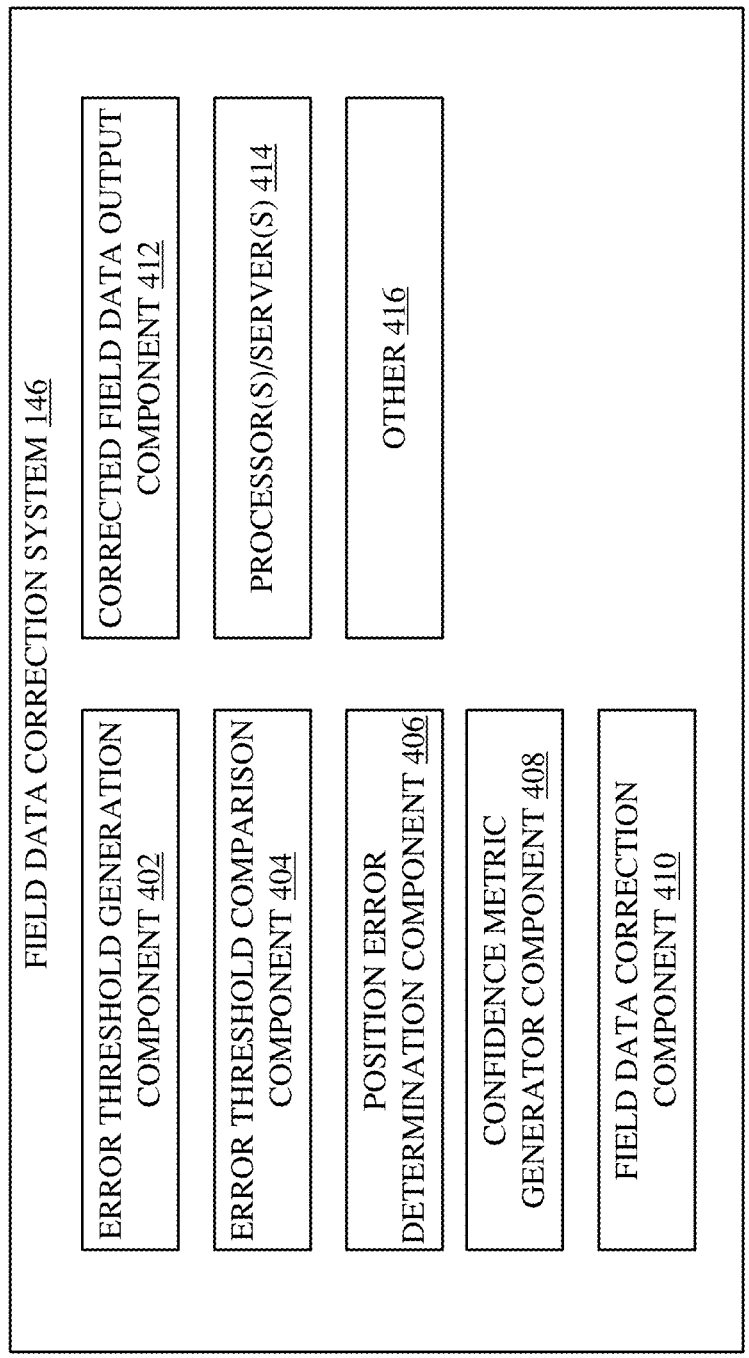
FIG. 8 illustrates one example of a field data correction system.

FIG. 8 illustrates one example of field data correction system 146. System 146 includes error threshold generator component 402, error threshold comparison component 404, position error determination component 406, and a confidence generator component 408. Error threshold generator component 402 is configured to generate a position error threshold that is compared by component 404 to a position error determined by component 406. In one example, discussed in further detail below, position error determination component 406 determines the position error based on a distance between the location of a crop row as indicated in the prior field map data 176 and the location of the crop row as determined based on in situ data obtained from sensor signals generated by sensors 140.

Confidence metric generator component 408 is configured to generate a confidence metric for the determined position error and to analyze the confidence metric, such as by comparing the confidence metric to a confidence metric threshold that determines further action by system 146. System 146 also includes a field data correction component 410, a corrected field data output component 412, and one or more processors or servers 414, and can include other items as well. Field data correction component 410 is configured to correct the prior field map data based on the position error determined by component 406. In one example, discussed in further detail below, the correction can be based on a determination that the position error exceeds the error threshold generated or otherwise obtained by component 402 and/or meets a confidence level threshold determination by component 408.

Figures 1, 9:
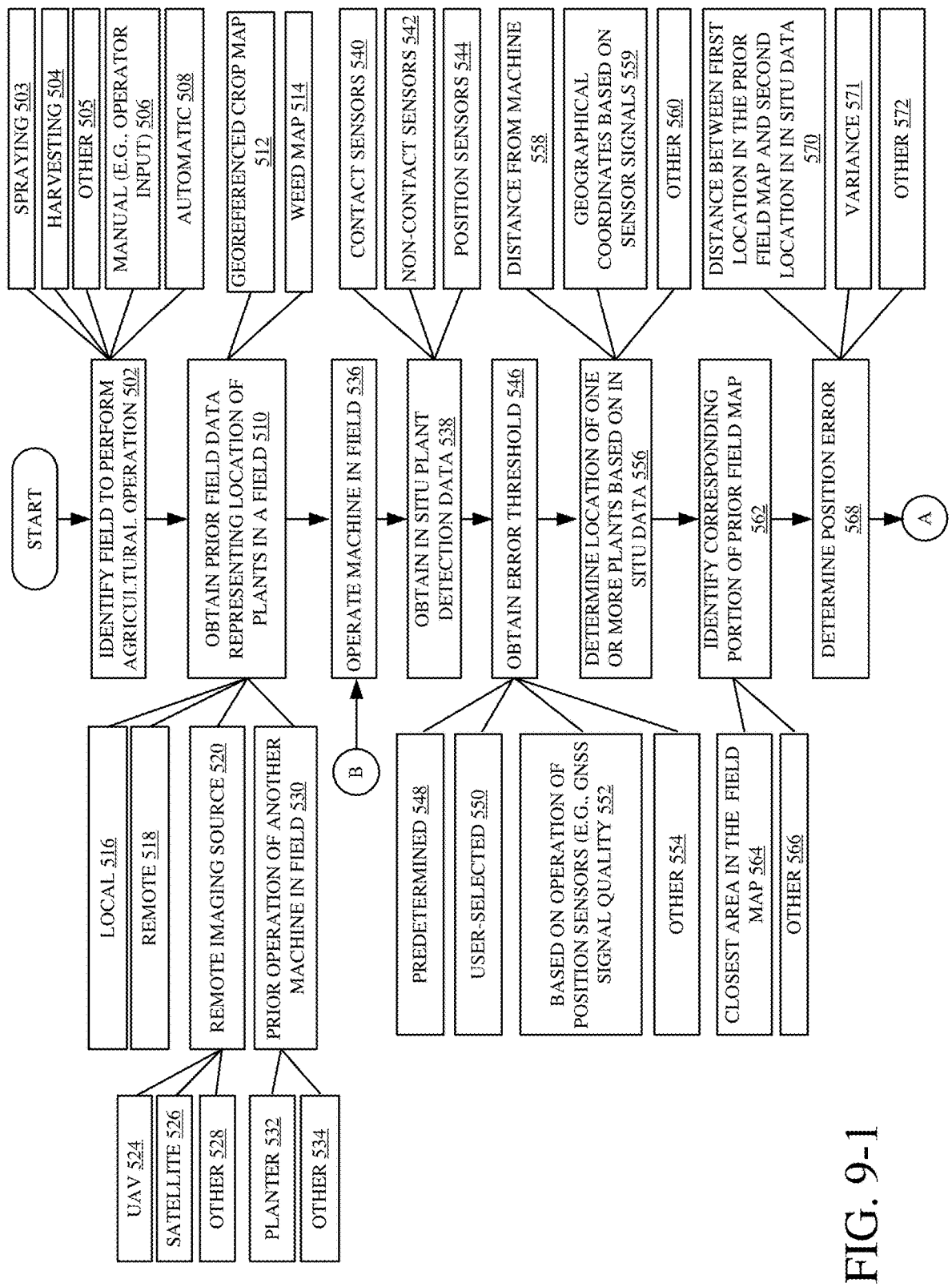
Figures 2, 9:
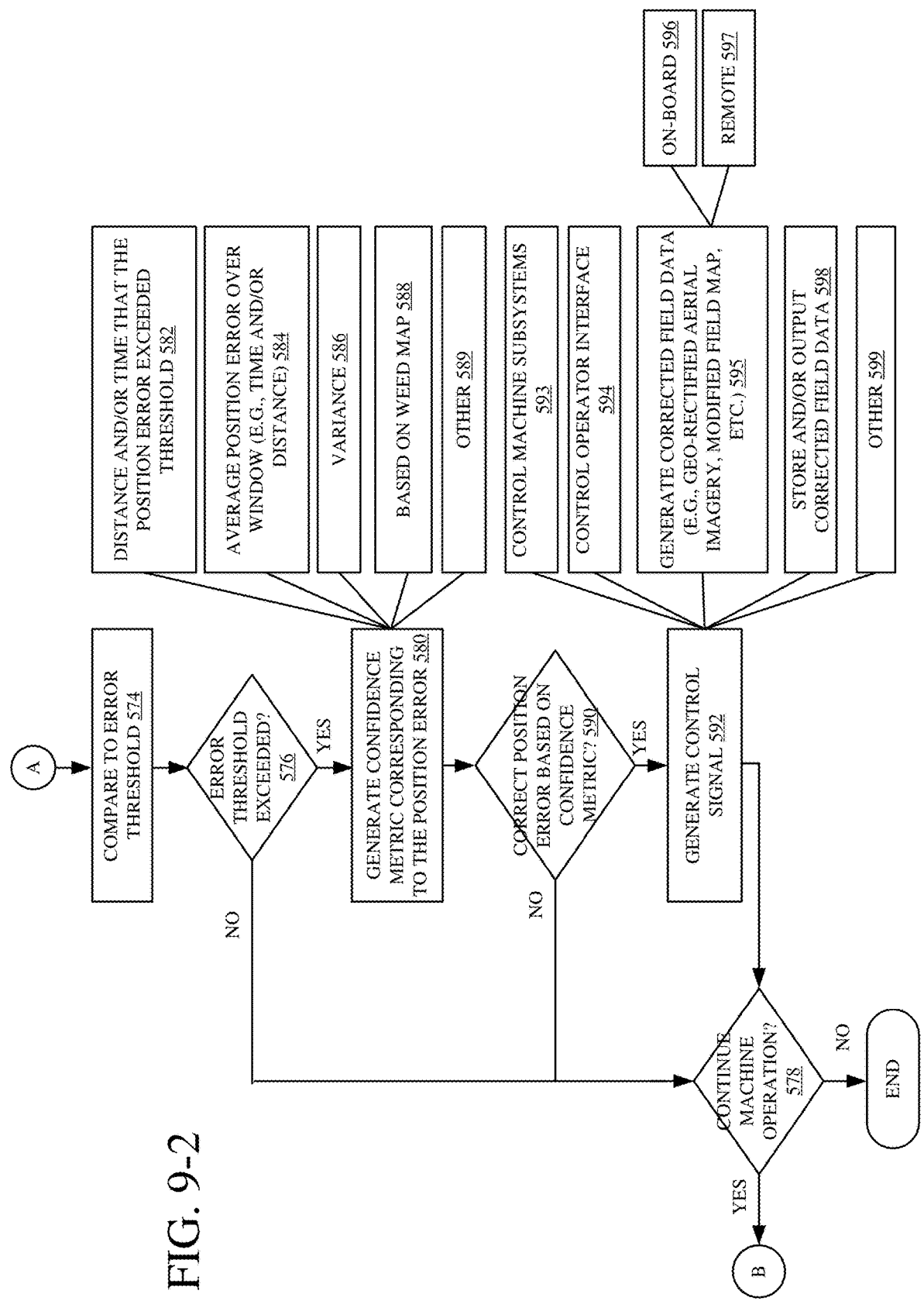

FIG. 9 is a flow diagram illustrating one example of field data error identification and correction. For sake of illustration, but not by limitation, FIG. 9 will be described in the context of agricultural machine 102 illustrated in FIG. 1 and field data correction system 146 illustrated in FIG. 8.

At block 502, control system 106 identifies a target field on which to perform an agricultural operation. The agricultural operation can include any of a wide variety of different types of operations. For instance, as represented at block 503, a spraying operation can apply an agricultural substance, such as an herbicide, pesticide, fertilizer, etc. to the field. In another example, as represented at block 504, the agricultural operation can include a harvesting operation. Other types of agricultural operations can be performed as well, as represented at block 505.

Also, it is noted that the field can be identified manually, such as based on operation input (block 506) and/or automatically (block 508). For instance, operator 132 can provide input through operator interface 130 selecting the target field. In another example, control system 106 can automatically identify the field based on location data obtained from position sensors 136.

At block 510, prior field data is obtained that represents locations of plants on the identified field. For instance, the prior field data can include a georeferenced crop map that identifies crop rows in the field, as represented at block 512. Alternatively, or in addition, the prior field data can include a georeferenced weed map that identifies the locations of weed (i.e., non-crop) plants, as represented at block 514.

The prior field data can be stored and obtained local (block 516) to agricultural machine 102, such as in data store 162. Alternatively, or in addition, the prior field data can be obtained remotely (block 518), such as from data store 174.

As noted above, the prior field data can be generated in any of a number of ways. For example, the prior field data can be based on remote imaging, as represented at block 520. For instance, a crop map can be generated from images obtained from a UAV (block 524) a satellite imaging system (block 526) or from another imaging source (block 528).

Also, the prior field data can be obtained based on operation of another agricultural machine in the field, as represented at block 530. For instance, during a planting operation that planted the crop rows, data can be obtained from the planting machine that indicates the location that the seeds were placed on the field. Generating the prior field map based on planter-obtained data is represented at block 532. Of course, the prior field data can be obtained in other ways as well, as represented at block 534.

Figures 1, 10:
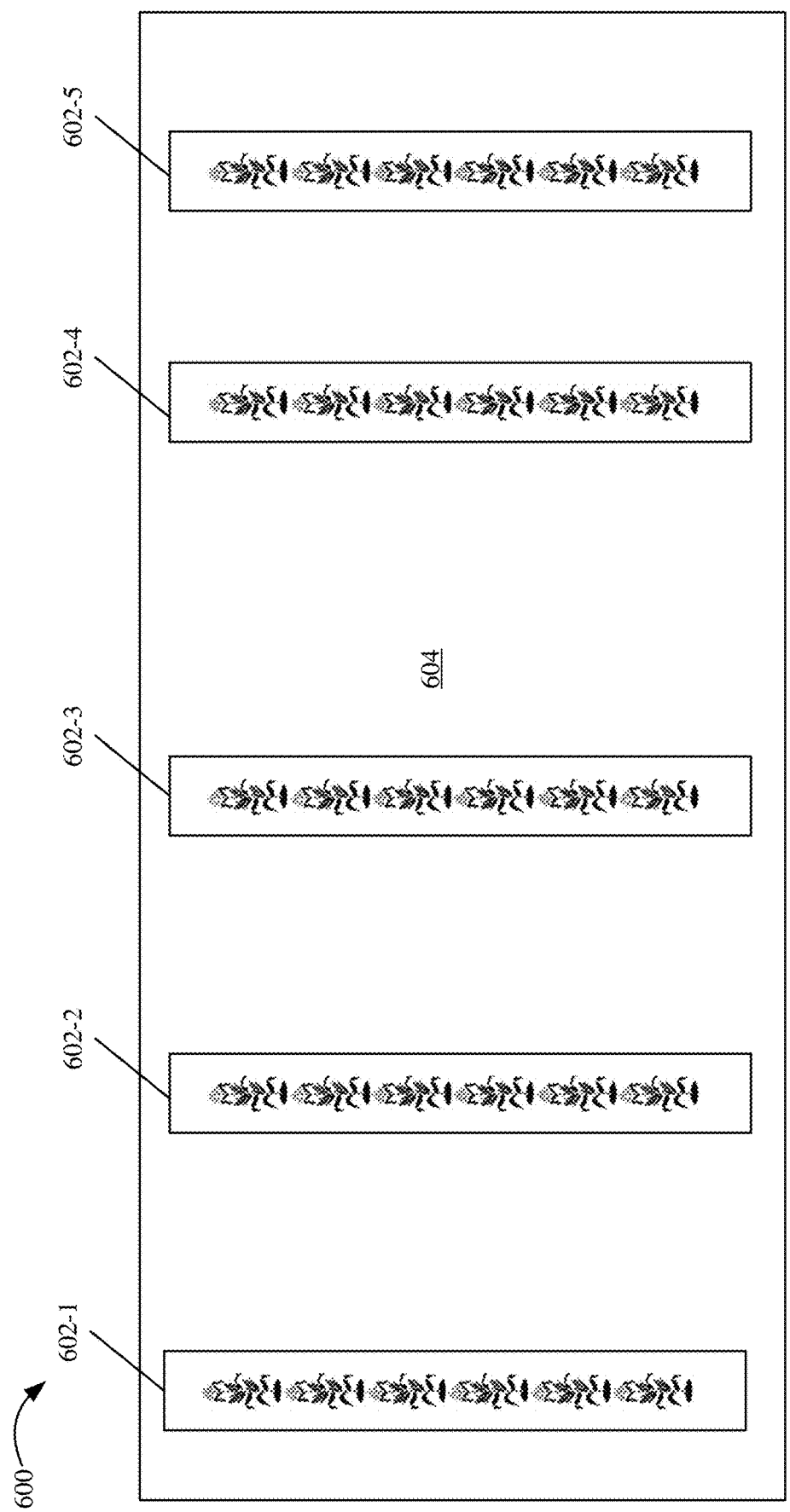
Figures 2, 10:
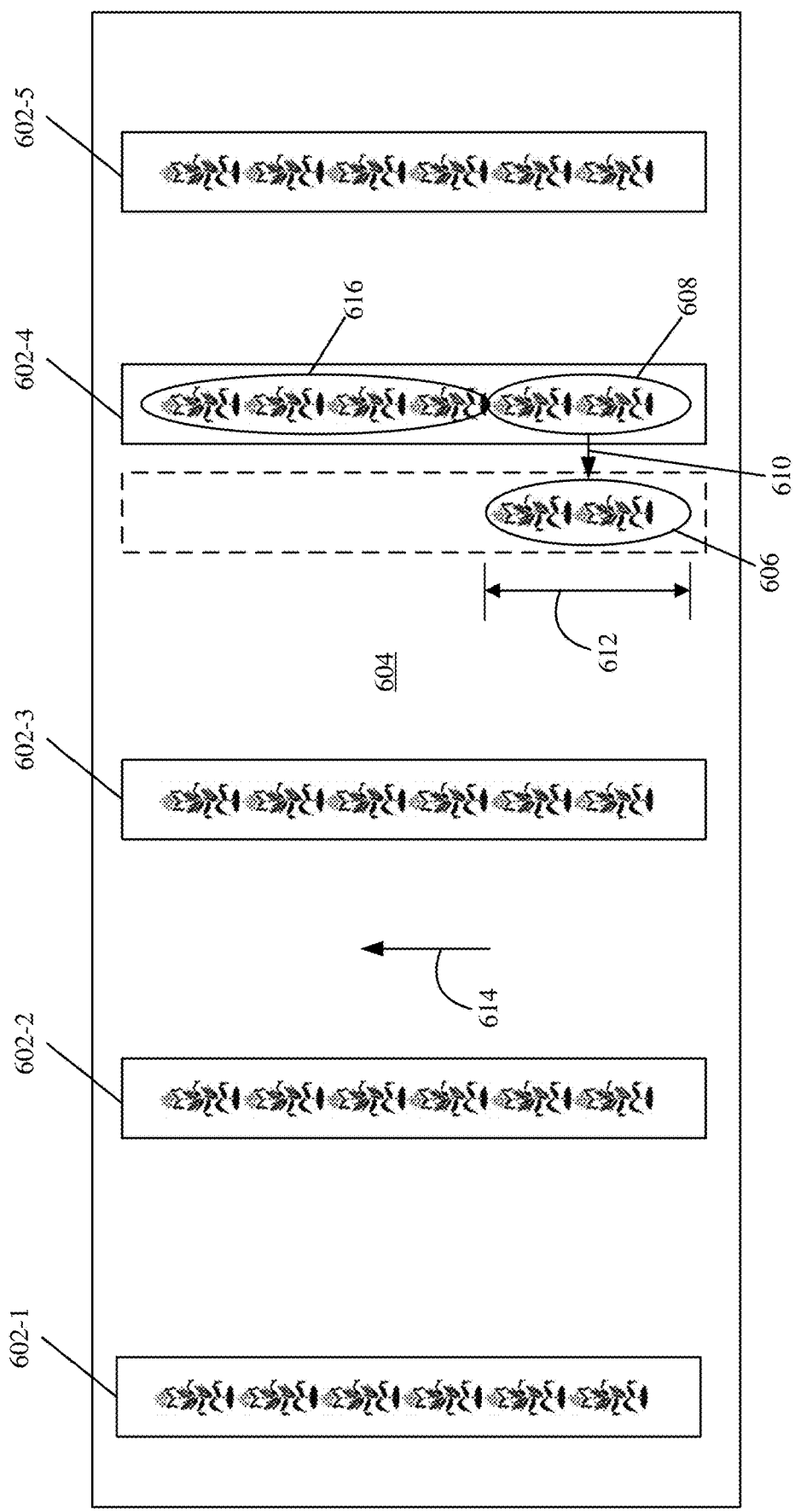
Figures 3, 10:
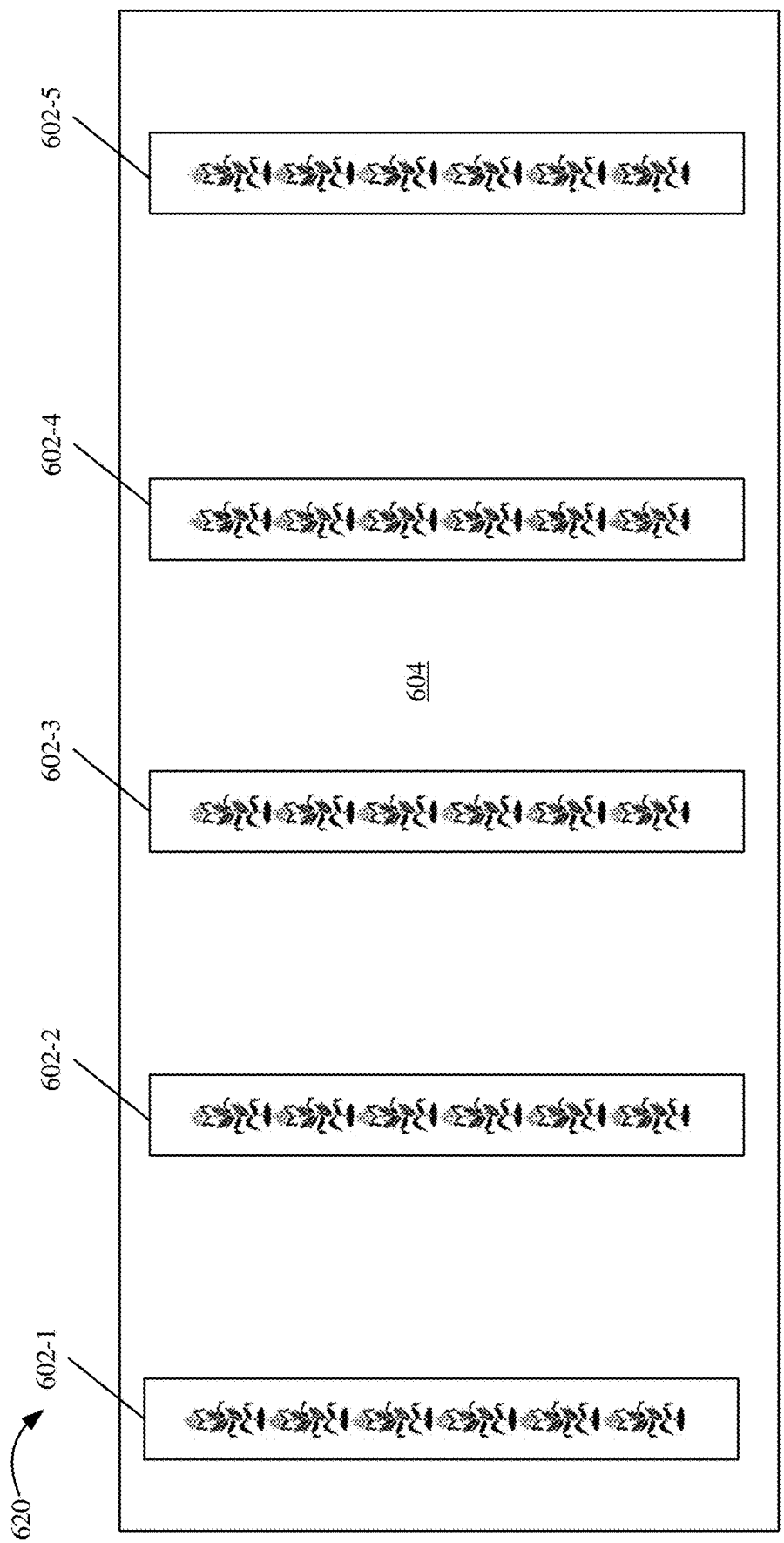

FIG. 10-1 illustrates one example of prior field data 600, in the form of a crop map that identifies a plurality of crop rows 602-1, 602-2, 602-3, 602-4, and 602-5 (collectively referred to as crop rows 602) on a field 604.

Referring again to FIG. 9, at block 536, the machine is operated in the field. During the operation, in situ plant detection data is obtained at block 538. For example, plant location data can be obtained from contact sensors 180 (block 540) and/or from non-contact sensors 182 (block 542). Also, the in situ plant detection data can include location data obtained from position sensors 136 (block 544).

At block 546, error threshold generation component 402 generates or otherwise obtains an error threshold. In one example, the error threshold represents a threshold distance (e.g., in terms of inches or feet) that will trigger or otherwise control field data correction system to correct the position error. The error threshold can be obtained in any of a number of ways. For instance, at represented at block 548, the error threshold can be predetermined. In another example, at block 550, the error threshold can be selected by operator 132, such as through operator interface 130. Alternatively, or in addition, the error threshold can be generated and/or dynamically modified based on the operation of position sensors, as represented at block 552. For example, the error threshold can be set based on detected operational characteristics of the position system. For instance, the error threshold can be based on GNSS signal strength and/or a current accuracy of the GNSS detection relative to a nominal error. For sake of illustration, but not by limitation, block 552 can indicate an accuracy estimate of the GNSS operation. For instance, in the case of a Global Positioning System (GPS) with real-time kinematic (RTK) having a nominal error of a few centimeters, the error threshold can be set at block 552 to be one-half meter such that system 146 corrects position errors that exceed one-half meter. This, of course, is for sake of example only. The error threshold can be obtained in other ways as well, as represented at block 554.

At block 556, an indication of plant locations on the field is obtained from the in situ data. For instance, at block 558, component 106 determines a location of plants relative to the machine based on the sensor signals. An example is discussed above with respect to FIGS. 6 and 7. At block 559, geographic coordinates (e.g., GPS coordinates) of the plants is determined based on the signals from the sensors at block 538. Accordingly, the plants detected in the in situ data are georeferenced to the field. Of course, the location can be determined in other ways as well, as represented at block 560.

At block 562, a corresponding portion of the prior field map (that corresponds to the plant location indications from block 556) is identified. In one example, as represented at block 564, a closest plant area is identified from the prior field map based on the corresponding geographic coordinates.

For sake of illustration, FIG. 10-2 illustrates the plant locations identified at block in the context of the prior field data of FIG. 10-1. As shown, one or more plants are identified from the in situ data at a location represented by reference numeral 606, based on the signals from crop stock detectors 184 and the corresponding position data obtained from position sensors 136. Then, block 562 determines that area 608 corresponds to area 606. In other words, block 562 determines that the plants indicated in the prior field data as being located in area 608 are actually located in area 606.

Of course, the corresponding portion of the prior field map can be identified in other ways as well, as represented at block 566 in FIG. 9. At block 568, a position error is determined based on the first indication of the plant location in the prior field map (i.e., area 608 in the example of FIG. 10-2) and the second indication of the plant location from the in situ data (i.e., area 606 in the example of FIG. 10-2). As represented at block 570, the position error is based on a distance between the first and second indications. The distance can be computed in any number of ways. For instance, the distance can be computed using a latitude/longitude calculation to the coordinates of the plant(s) in areas 606 and 608.

Also, the position error can be determined based on a variance of the offset between the plant locations in the prior field data and the in situ data, as determined over a time and/or distance window. For instance, the position error can be determined based on an average location offset over a defined travel distance 612 (e.g., five feet, ten feet, fifty feet, etc. in a direction of travel 614). Travel distance 612 can be defined in any of a number of ways. For instance, travel distance 612 can be predefined, user-defined, and/or dynamically defined based on operation of system 146. Of course, the position error can be identified in other ways as well, as represented by block 572.

At block 574, the position error determined at block 568 is compared to the error threshold obtained at block 546. If, at block 576, the error threshold is not exceeded, operation proceeds to block 578, which determines whether the machine operation is continued. If so, the operation returns to block 536.

If the threshold is exceeded at block 576, operation proceeds to block 580 where confidence metric generator component 408 generates a confidence metric or value corresponding to the position error. The confidence metric can be generated in any of a number of ways. Illustratively, the confidence metric indicates a confidence level that the in situ data represents an actual offset of the crop row from the prior field map data. The confidence metric can be generated in any of a number of ways. For instance, as represented at block 582, the confidence metric can be based on a distance and/or time that the position error exceeded the threshold. For example, a high confidence metric is assigned if the position error threshold is exceeded for a relatively large distance (e.g., one hundred feet or more), and a low confidence metric is generated if the error threshold is only exceeded for ten feet.

Alternatively, or in addition, the confidence metric can be based on an average position error over a given time and/or distance window, as represented at block 584. The time and/or distance window can be predefined, user-defined, automatically defined based on operation of system 146, or defined in other ways. In one example, block 580 averages the position error over the last x feet (e.g., fifty feet, one hundred feet, etc.) traveled by machine 102. Also, the confidence metric can be based on a variance or standard deviation of the position error over that window, as represented at block 586. In one example, a narrow or small variance in the position error (that exceeds the error threshold), is assigned a higher confidence metric than larger variances.

Also, if machine 102 is traversing a weed patch in the field (i.e., an area having weeds, or at least a number of weeds above a threshold), sensors 180 may incorrectly identify the weeds as crop plants. Accordingly, in one example at block 588, the confidence metric can be generated based on a weed map obtained at block 514. For instance, if the weed map indicates that machine 102 is in an area of the field having weeds, the confidence metric can be lowered.

The amount the confidence metric is lowered can be based on the quantity of weeds in the area of the field, or can be computed based on the weed map in other ways as well.

The confidence metric can be generated in other ways as well, as represented at block 589. At block 590, field data correction component 410 determines whether to correct the position error based on the confidence metric generated at block 580. In one example, field data correction component 410 can compare the confidence metric to a threshold confidence metric and, if the confidence metric threshold is exceeded, a control signal is generated at block 592 to control agricultural machine 102 based on the determined position error.

In one example, at block 593, one or more subsystems 126 are controlled based on the position error. For example, but not by limitation, steering subsystem 156 can be controlled to adjust the travel direction of machine 102 based on the position error in the prior field data. In another example, in the case of a spraying machine, field operation subsystem 158 is controlled to selectively apply a substance to areas of the field based on the position error. Of course, subsystems 126 can be controlled in other ways as well.

At block 594, operator interface 130 is controlled to render an indication of the position error. For example, a display can be provided to operator 132 to identify the position error and/or the confidence metric generated at block 580. For instance, assume an offset bias of three inches over the last five hundred feet of machine travel has been detected. At block 594, operator interface 130 can render (e.g., visually, audibly, etc.) an indication to operator 132 that the offset bias has been observed, along with the specific distance numbers. Also, interface 130 can provide a suggested corrective action, such as to accept correction of the prior field data. One example includes rendering a visual indication of the field map and the position error, and provide a user input mechanism that allows the operator to accept the corrective action, at block 590.

At block 595, control system 106 can generate a control signal to control generation of corrected field data (e.g., geo-rectified aerial imagery, a modified field map, etc.) that corrects the position error in the prior field data. For example, with reference to FIG. 10-2, field data correction component 410 determines that the particular row unit that planted the seeds in crop row 602-4 was offset by distance 610, relative to the locations in the prior field map, resulting the position error between 606 and 608. Based on the determination, component 410 determines that a second area 616 in crop row 602-4 also includes position error, and corrects with portion of the prior field data as well. FIG. 10-3 illustrates a modified field map 620 in which the location of crop row 602-4 in field data 600 has been corrected to reflect the location of crop row 602-4 determined based on the in situ data.

As represented by block 596, the correction of the field data can be performed on-board machine 102, such as by field data correction component 410 generating a geo-rectified field map. In another example, as represented by block 597, the correction of the field data can be performed remotely, such as by remote computing system 114. For instance, block 592 can include control system 106 sending, to remote computing system 114, a representation of the position error and/or instructions to generate the corrected field data.

In either case, the correction of the field data can include geo-rectifying the aerial imagery obtained by system 118 and/or correcting a field map that was generated from the aerial imagery. The corrected field data can be subsequently used to, for example, create map-based guidance lines for machine steering, perform map-based analysis (e.g., boundary or variety mapping and area-based measurements), perform map-based spraying applications with precise prescription zones for certain chemicals and accurate boundaries for the chemical to start/stop, to name a few.

At block 598, the corrected field data can be output to other machine(s) or system(s) and/or stored (e.g., in data stores 162, 168, 174). Of course, machine 102 can be controlled in other ways as well, as represented by block 599.

It can thus be seen that the present features provide a map-based control system that identifies and corrects position error based on in situ or field-truth data. The position error correction and result in an improved control input to the control system, as the prior field data being used for control decisions more closely reflects the actual plant locations in the field. This improves operation of the agricultural machine, such as, but not limited to, improving crop care and/or harvesting functions, which in turn can improve crop health and yield, to name a few.

The present discussion has mentioned processors and servers. In one example, the processors and servers include computer processors with associated memory and timing circuitry, not separately shown. The processors and servers are functional parts of the systems or devices to which the processors and servers belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 11:
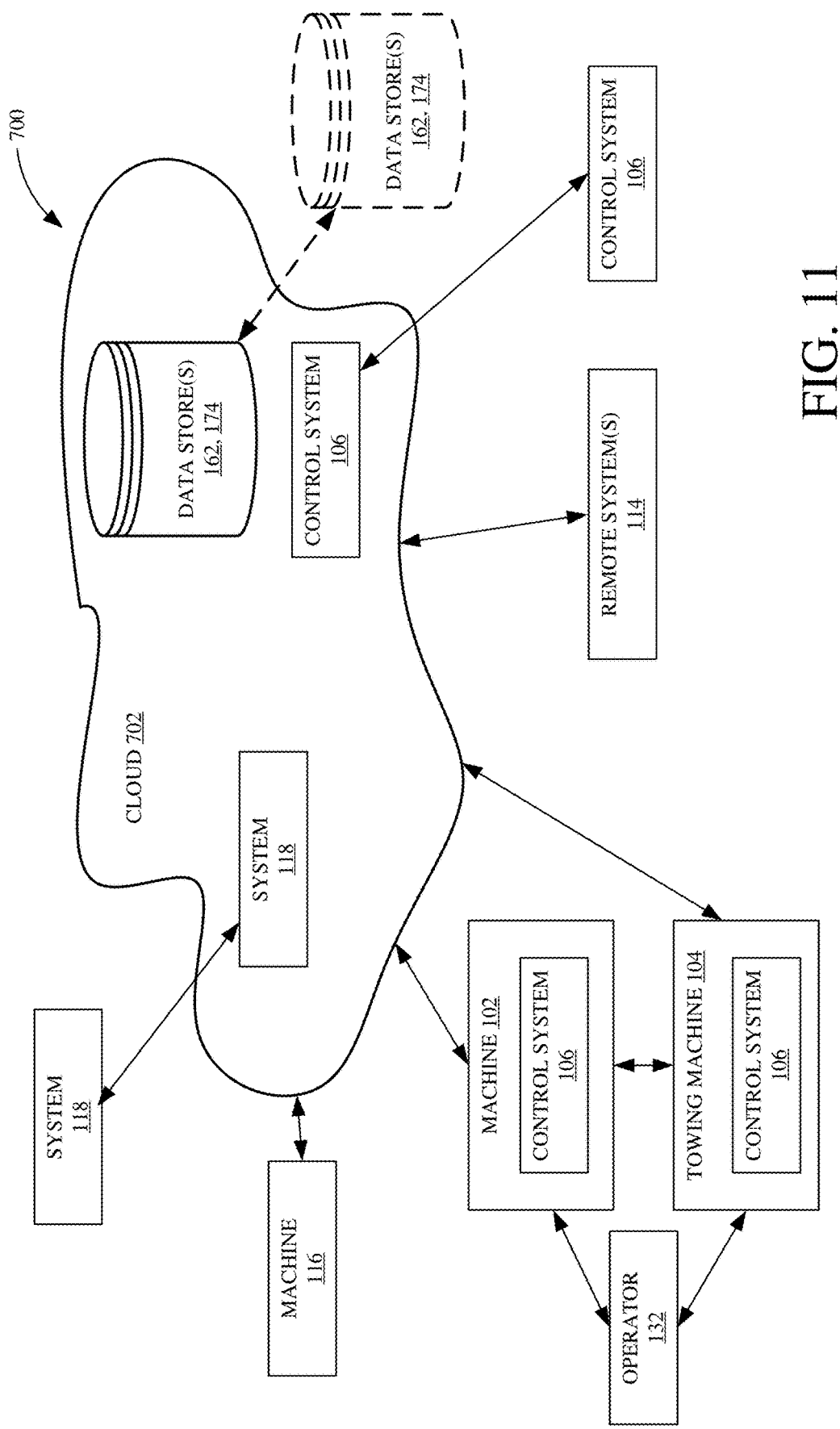
FIG. 11 is a block diagram showing one example of the control system illustrated in FIG. 1, deployed in a remote server architecture.

FIG. 11 is a block diagram of one example of agricultural architecture 100, shown in FIG. 1, where machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in previous FIGS. as well as the corresponding data, can be stored on servers at a remote location. The computing resources in a remote server environment can be consolidated at a remote data center location or the computing resources can be dispersed. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 11, some items are similar to those shown in previous figures and the items are similarly numbered. FIG. 11 specifically shows system 106 and/or system 118 from previous FIGS. can be located at a remote server location 702. Therefore, machine 102, machine 104, machine 116, and/or system 114 can access those systems through remote server location 702.

FIG. 11 also depicts another example of a remote server architecture. FIG. 11 shows that it is also contemplated that some elements of previous FIGS. are disposed at remote server location 702 while others are not. By way of example, one or more of data store 162, data store 174, system 106, and system 118 can be disposed at a location separate from location 702, and accessed through the remote server at location 702. Regardless of where the systems and data stores are located, the systems and data stores can be accessed directly by machines 102, 104, and/or 116 through a network (either a wide area network or a local area network), the systems and data stores can be hosted at a remote site by a service, or the systems and data stores can be provided as a service, or accessed by a connection service that resides in a remote location. All of these architectures are contemplated herein.

It will also be noted that the elements of the FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
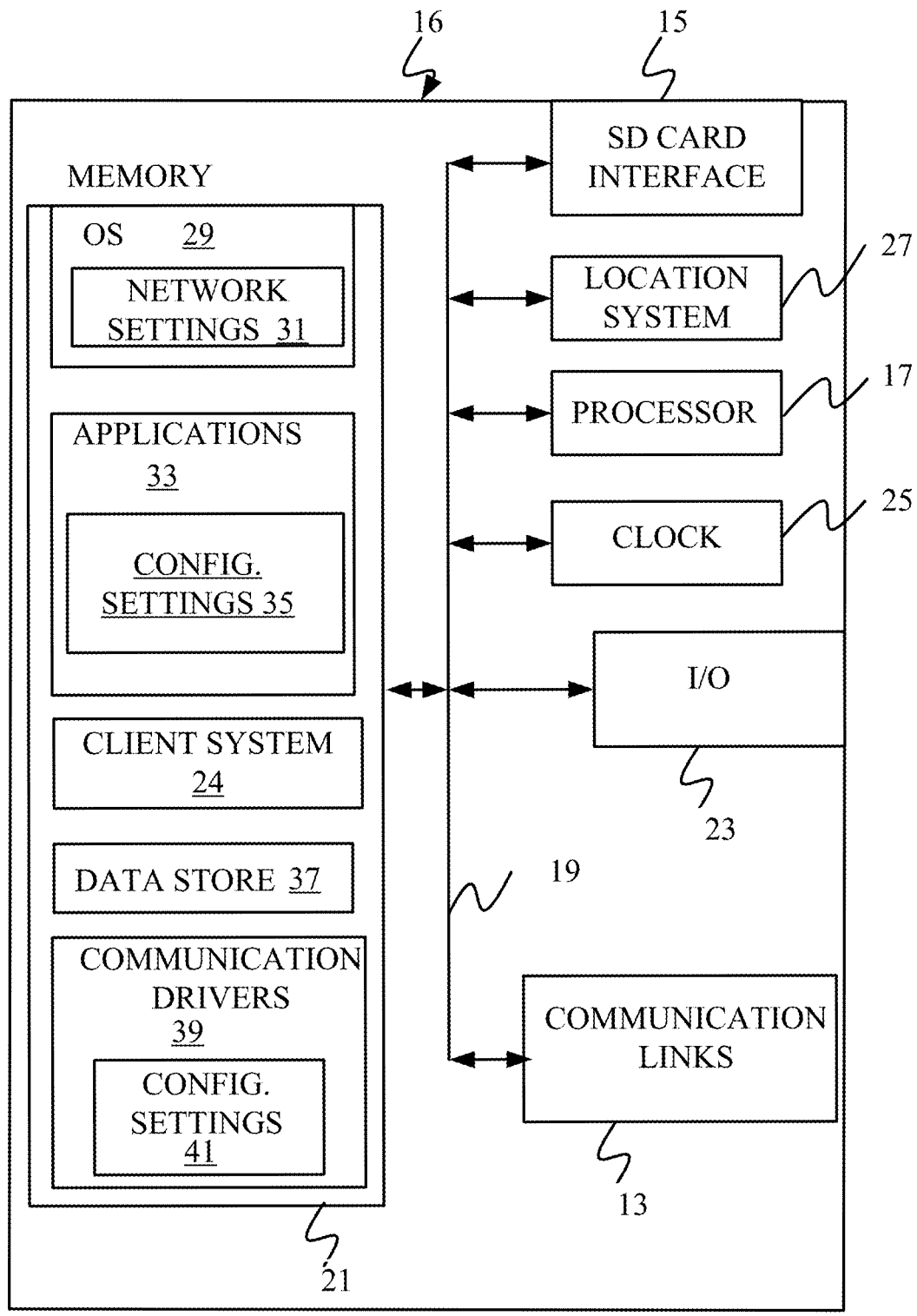
FIGS. 12-14 show examples of mobile devices.
Figure 13:
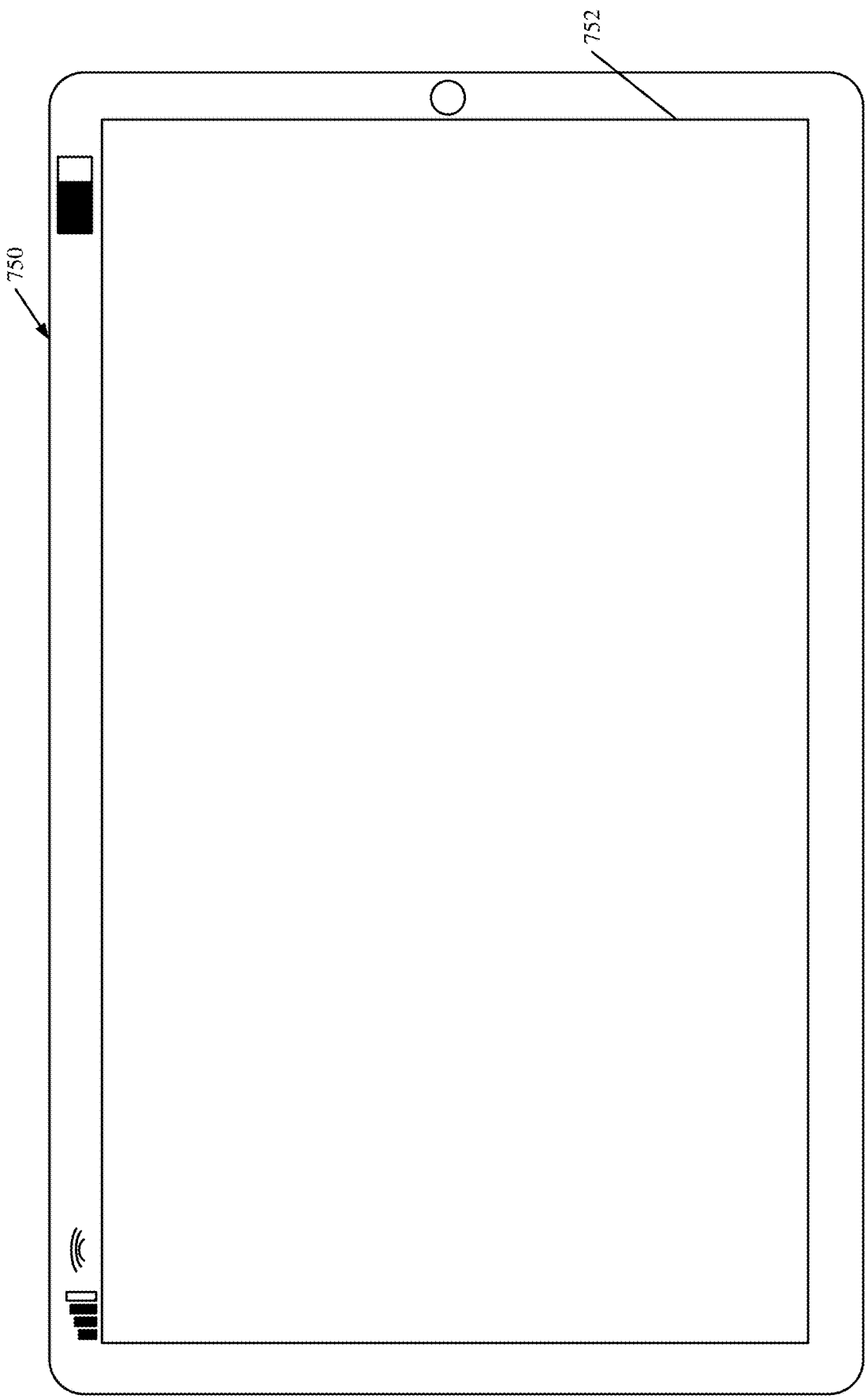
Figure 14:
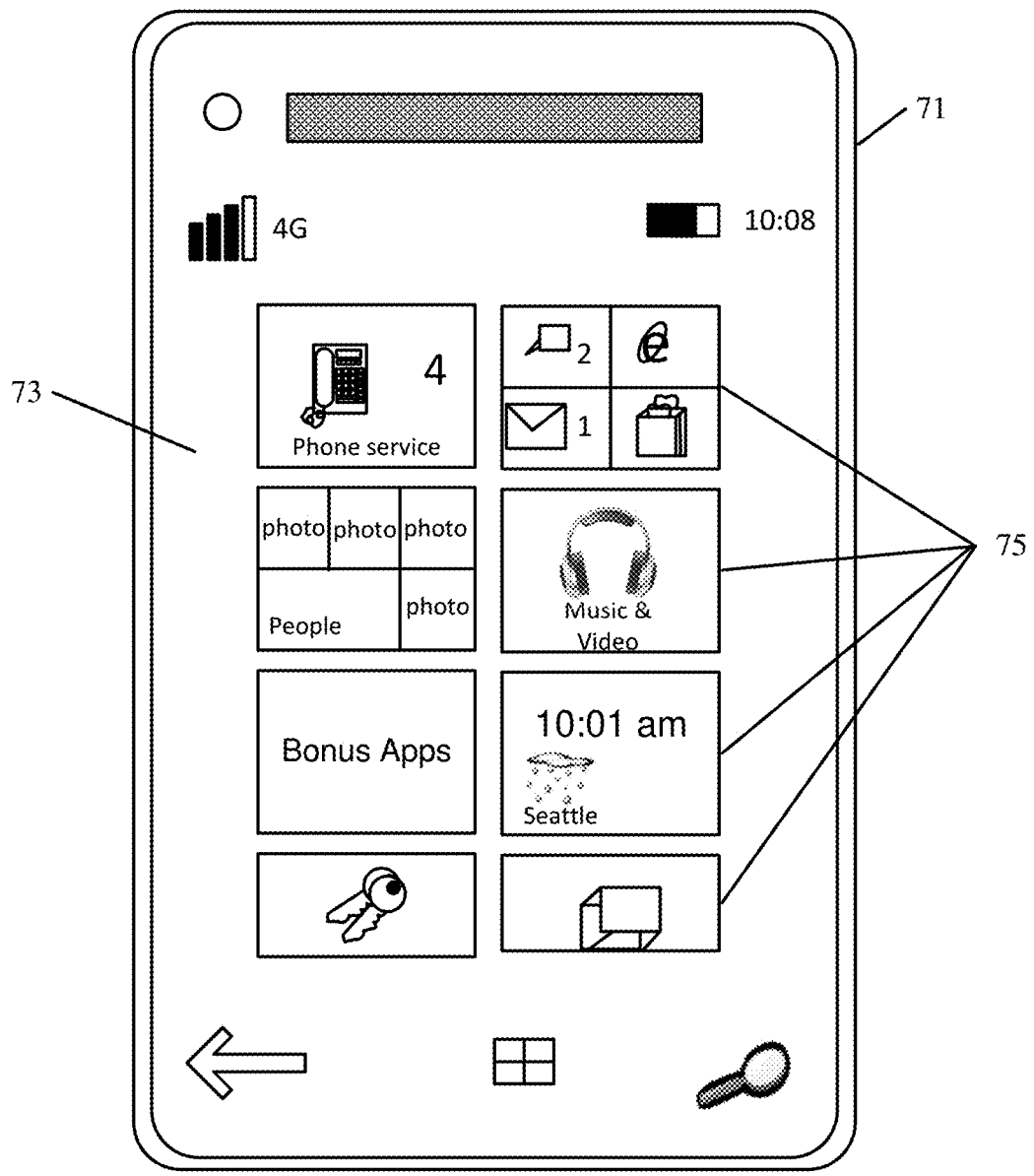

FIG. 12 is a simplified block diagram of one illustrative example of a handheld or mobile computing device that can be used as a user's or client's hand held device 16, in which the present system (or parts of the present system) can be deployed. For instance, a mobile device can be deployed in the operator compartment of machine 102 and/or 104 for use in generating, processing, or displaying the overspray data and position data. FIGS. 13-14 are examples of handheld or mobile devices.

FIG. 12 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively includes a real time clock component that outputs a time and date. Clock 25 can also, illustratively, provide timing functions for processor 17.

Location system 27 illustratively includes a component that outputs a current geographic location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 750. In FIG. 13, computer 750 is shown with user interface display screen 752. Screen 752 can be a touch screen or a pen-enabled interface that receives inputs from a pen or stylus. Screen 752 can also use an on-screen virtual keyboard. Of course, screen 752 might also be attached to a keyboard or other user input device through a suitable attachment mechanism, such as a wireless link or USB port, for instance. Computer 750 can also illustratively receive voice inputs as well.

FIG. 14 shows that the device can be a smart phone 71. Smart phone 71 has a touch sensitive display 73 that displays icons or tiles or other user input mechanisms 75. Mechanisms can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
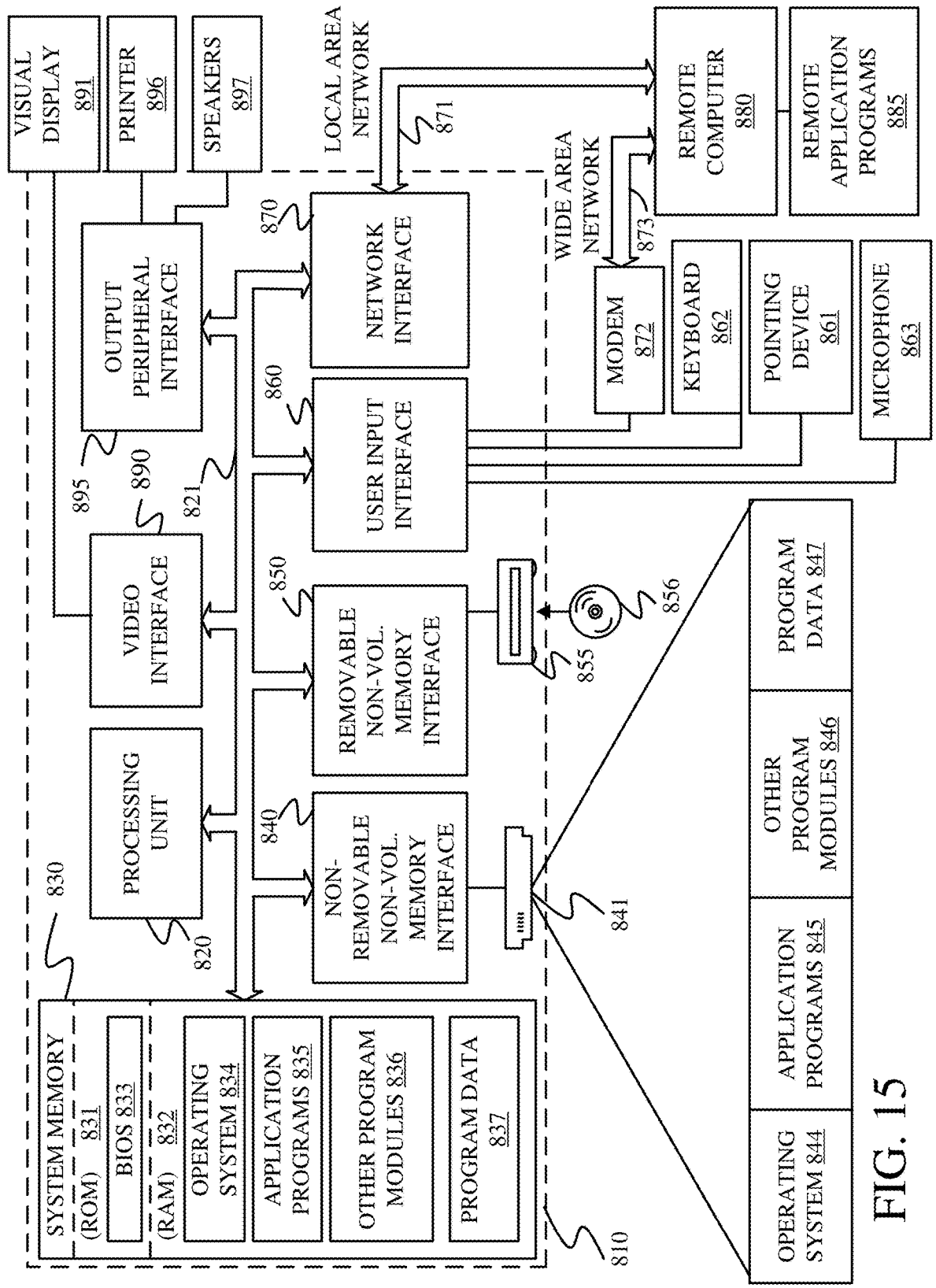
FIG. 15 is a block diagram showing one example of a computing environment that can be used in the architectures and systems shown in the previous FIGS.

FIG. 15 is one example of a computing environment in which elements of previous FIGS., or parts of them, (for example) can be deployed. With reference to FIG. 15, an example system for implementing some embodiments includes a general-purpose computing device in the form of a computer 810 programmed to operate as discussed above. Components of computer 810 may include, but are not limited to, a processing unit 820 (which can include processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may include computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware components. For example, and without limitation, illustrative types of hardware components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of controlling a mobile agricultural machine, the computer-implemented method comprising:
   obtaining prior field data representing a position of plants in a field;
   obtaining in situ plant detection data from operation of the mobile agricultural machine in the field;
   determining a position error that represents a distance between a first indication of plant location in the prior field data and a second indication of plant location in the in situ plant detection data; and
   generating a control signal that controls the mobile agricultural machine based on the position error.

2. The computer-implemented method of claim 1, wherein
   the first indication of plant location in the prior field data comprises a first indication of a location of a crop row on the field;
   obtaining the in situ plant detection data comprises:
      receiving a plant detection signal from a plant detection sensor on the mobile agricultural machine; and
      receiving a location sensor signal that corresponds to the plant detection signal and is indicative of a sensed geographic location of the mobile agricultural machine on the field; and
      generating a second indication of the location of the crop row based on the plant detection signal and the sensed geographic location; and
   determining the position error comprises determining a distance between the first and second indications of the location of the crop row.

3. The computer-implemented method of claim 2, wherein the plant detection sensor comprises a contact sensor configured to contact the plants in the field.

4. The computer-implemented method of claim 2, wherein the prior field data comprises a georeferenced field map that identifies crop row locations in the field.

5. The computer-implemented method of claim 2, wherein the mobile agricultural machine comprises at least one of:
a harvesting machine, or
an agricultural product application machine configured to apply an agricultural product to the field.

6. The computer-implemented method of claim 1, wherein the position error represents an offset between a plant location indicated in the prior field data and an actual planting location on the field.

7. The computer-implemented method of claim 2, wherein generating the control signal comprises controlling the mobile agricultural machine to generate modified field data by modifying the prior field data based on the determined position error.

8. The computer-implemented method of claim 7, and further comprising:
generating the modified field data based on determining that the position error meets a position error threshold.

9. The computer-implemented method of claim 8, wherein the position error threshold is based on the location sensor signal.

10. The computer-implemented method of claim 7, and further comprising:
determining a variance of the position error over a distance window; and
generating the modified field data based on the variance.

11. The computer-implemented method of claim 7, wherein generating the control signal comprises controlling the mobile agricultural machine based on the modified field data.

12. The computer-implemented method of claim 7, wherein generating the control signal comprises controlling a user interface device of the mobile agricultural machine to render an indication of the position error.

13. A mobile agricultural machine comprising:
a field operation subsystem configured to perform an agricultural operation on a field;
a plant detection sensor configured to generate a plant detection signal indicative of plants detected on the field;
a location sensor configured to generate a location signal indicative of a location of the mobile agricultural machine on the field; and
a control system configured to:
obtain prior field data representing a position of plants on the field;
determine a position error that represents a distance between an indication of plant location in the prior field data and an indication of actual plant location on the field based on the plant detection signal and the location signal; and
generate a control signal that controls the mobile agricultural machine based on the determined position error.

14. The mobile agricultural machine of claim 13, wherein
the indication of plant location in the prior field data comprises a first indication of a location of a crop row on the field;
the indication of actual plant location on the field comprises a second indication of the location of the crop row; and
the control system is configured to:
determine the position error based on a distance between the first indication of the location of the crop row and the second indication of the location of the crop row.

15. The mobile agricultural machine of claim 14, wherein
the plant detection sensor comprises a contact sensor configured to contact the plants in the field, and
the prior field data comprises a georeferenced field map that identifies crop row locations in the field.

16. The mobile agricultural machine of claim 13, wherein the mobile agricultural machine comprises one of:
a harvesting machine, or
an agricultural product application machine configured to apply an agricultural product to the field.

17. The mobile agricultural machine of claim 13, wherein the control system is configured to:
generate modified field data based on a determination that the position error meets a position error threshold.

18. The mobile agricultural machine of claim 17, wherein the control system is configured to:
determine a variance of the position error over a distance window;
generate the modified field data based on the variance; and
control the mobile agricultural machine based on the modified field data.

19. A control system for a mobile agricultural machine, the control system comprising:
at least one processor; and
memory storing instructions executable by the at least one processor, wherein instructions, when executed, cause the control system to:
obtain prior field data representing a position of plants in a field;
obtain in situ plant detection data from operation of the mobile agricultural machine in the field;
determine a position error representing an offset between a plant location indicated in the prior field data and an actual planting location on the field identified based on the in situ plant detection data; and
generate a control signal that controls the mobile agricultural machine based on the determined position error.

20. The control system of claim 19, wherein
the prior field data comprises a first indication of a location of a crop row on the field;
obtaining the in situ plant detection data comprises:
receiving a plant detection signal from a plant detection sensor on the mobile agricultural machine; and
receiving a location sensor signal that corresponds to the plant detection signal and is indicative of a sensed geographic location of the mobile agricultural machine on the field; and
generating a second indication of the location of the crop row based on the plant detection signal and the sensed geographic location; and
determining the position error comprises determining a distance between the first and second indications of the location of the crop row.

* * * * *